(12) United States Patent
Rushkin et al.

(10) Patent No.: US 12,257,769 B2
(45) Date of Patent: Mar. 25, 2025

(54) COMPOSITIONS COMPRISING A BINDER AND A POWDER, AND ASSOCIATED METHODS

(71) Applicant: Desktop Metal, Inc., Burlington, MA (US)

(72) Inventors: Ilya L. Rushkin, Acton, MA (US); Yun Bai, Burlington, MA (US); Shannon Lee Taylor, Westford, MA (US)

(73) Assignee: Desktop Metal, Inc., Burlington, MA (US)

( * ) Notice: Subject to any disclaimer, the term of this patent is extended or adjusted under 35 U.S.C. 154(b) by 882 days.

(21) Appl. No.: 17/285,650

(22) PCT Filed: Oct. 16, 2019

(86) PCT No.: PCT/US2019/056508
§ 371 (c)(1),
(2) Date: Apr. 15, 2021

(87) PCT Pub. No.: WO2020/081666
PCT Pub. Date: Apr. 23, 2020

(65) Prior Publication Data
US 2021/0394265 A1     Dec. 23, 2021

Related U.S. Application Data

(60) Provisional application No. 62/746,131, filed on Oct. 16, 2018.

(51) Int. Cl.
*B22F 1/00*     (2022.01)
*B22F 1/10*     (2022.01)
(Continued)

(52) U.S. Cl.
CPC .............. *B29C 64/165* (2017.08); *B22F 1/10* (2022.01); *B22F 1/107* (2022.01); *B22F 10/14* (2021.01);
(Continued)

(58) Field of Classification Search
None
See application file for complete search history.

(56) References Cited

U.S. PATENT DOCUMENTS 2,186,328 A    1/1940   Daniels
4,244,985 A    1/1981   Graff et al.
(Continued)

FOREIGN PATENT DOCUMENTS

WO    WO 2017/040893 A1    3/2017
WO    WO 2018/156933 A1    8/2018

OTHER PUBLICATIONS

[No Author Listed], 3-Aminopropylphosphonic acid, CID: 97587, PubChem, May 7, 2021. https://pubchem.ncbi.nlm.nih.gov, 4 pages.
(Continued)

*Primary Examiner* — Jenny R Wu
(74) *Attorney, Agent, or Firm* — Viering, Jentschura & Partner mbB; Robert M Bilotta, Jr.

(57) ABSTRACT

The present invention generally relates to compositions comprising a binder and a metal powder, and associated methods. Some compositions provided include a polymer and a metal powder. Some compositions provided include a binder formulation and a metal powder. The binder formulation generally includes a first liquid and a polymer. The binder formulation may be a solution. The polymer may include a nitrogen-containing repeat unit. The metal powder may include a noble metal. Some methods provided include combining a metal powder with a binder formulation. Meth-
(Continued)

ods provided include but are not limited to additive manufacturing processes and injection molding processes.

21 Claims, 6 Drawing Sheets

(51) Int. Cl.
| | | |
|---|---|---|
| *B22F 1/107* | (2022.01) | |
| *B22F 10/14* | (2021.01) | |
| *B29C 64/165* | (2017.01) | |
| *B33Y 70/10* | (2020.01) | |
| *B22F 1/052* | (2022.01) | |
| *B29K 33/00* | (2006.01) | |

(52) U.S. Cl.
CPC ............... *B33Y 70/10* (2020.01); *B22F 1/052* (2022.01); *B22F 2304/10* (2013.01); *B29K 2033/26* (2013.01); *B29K 2039/06* (2013.01)

(56) References Cited

U.S. PATENT DOCUMENTS

| | | | |
|---|---|---|---|
| 4,558,082 | A | 12/1985 | Eckberg |
| 4,596,858 | A | 6/1986 | Gregor et al. |
| 6,508,980 | B1 | 1/2003 | Sachs et al. |
| 6,955,776 | B1 | 10/2005 | Feenstra |
| 8,808,867 | B2 | 8/2014 | Chun et al. |
| 9,708,502 | B2 * | 7/2017 | Naruse ..................... C08K 9/10 |
| 11,434,766 | B2 | 9/2022 | Channel et al. |
| 11,945,943 | B2 | 4/2024 | Renner et al. |
| 12,023,733 | B2 | 7/2024 | Renner et al. |
| 2005/0017394 | A1 | 1/2005 | Hocshmann et al. |
| 2008/0214764 | A1 | 9/2008 | Watanabe et al. |
| 2011/0014083 | A1 | 1/2011 | Amaya et al. |
| 2012/0097581 | A1 | 4/2012 | Chun et al. |
| 2016/0177122 | A1 | 6/2016 | Naruse et al. |
| 2016/0258298 | A1 | 9/2016 | Channel et al. |
| 2017/0283629 | A1 | 10/2017 | Fortier |
| 2018/0071820 | A1 | 3/2018 | Natarajan et al. |
| 2018/0272561 | A1 | 9/2018 | Kasperchik et al. |
| 2019/0054527 | A1 * | 2/2019 | Natarajan ............... B22F 10/38 |
| 2019/0091766 | A1 | 3/2019 | Kasperchik et al. |
| 2019/0111479 | A1 | 4/2019 | Kasperchik et al. |
| 2021/0053113 | A1 | 2/2021 | Renner et al. |
| 2021/0138550 | A1 | 5/2021 | Renner et al. |
| 2021/0162502 | A1 | 6/2021 | Rushkin et al. |
| 2021/0213532 | A1 | 7/2021 | Kowalski et al. |
| 2022/0088855 | A1 | 3/2022 | Williams et al. |
| 2022/0274174 | A1 | 9/2022 | Chen et al. |

OTHER PUBLICATIONS

Seehra et al., Introductory Chapter: Overview of the Properties and Applications of Noble and Precious Metals. IntechOpen. Jul. 4, 2018. https://www.intechopen.com/chapters/60006 [last accessed on Jun. 15, 2023], 19 pages.
U.S. Appl. No. 16/998,527, filed Aug. 20, 2020, Renner et al.
U.S. Appl. No. 17/075,355, filed Oct. 20, 2020, Renner et al.
U.S. Appl. No. 17/109,306, filed Dec. 2, 2020, Rushkin et al.
PCT/US2019/056508, Jan. 10, 2020, International Search Report and Written Opinion.
PCT/US2019/056508, Apr. 29, 2021, International Preliminary Report on Patentability.
Bai et al., Binder jetting additive manufacturing with a particle-free metal ink as a binder precursor. Materials & Design. Jun. 5, 2018;147:146-56.
Manière et al., Swelling negation during sintering of sterling silver: An experimental and theoretical approach. Results in Physics. Dec. 1, 2018;11:79-84.
International Search Report and Written Opinion mailed Jan. 10, 2020 in connection with International Application No. PCT/US2019/056508.
International Preliminary Report on Patentability mailed Apr. 29, 2021 in connection with International Application No. PCT/US2019/056508.
Holman et al., Surface Adsorption Effects in the Inkjet Printing of an Aqueous Polymer Solution on a Porous Oxide Ceramic Substrate. Journal of Colloid and Interface Science. 2002;247:266-274.
Kernan et al., Three dimensional printing of Tungsten carbide-cobalt using a cobalt oxide precursor. International Solid Freeform Fabrication Symposium. 2003. pp. 616-631.

* cited by examiner

COMPOSITIONS COMPRISING A BINDER AND A POWDER, AND ASSOCIATED METHODS

CROSS-REFERENCE TO RELATED APPLICATIONS

The present application is a U.S. National Stage patent application under 35 U.S.C. § 371 of International Patent Application No. PCT/US2019/056508, filed Oct. 16, 2019, which claims the benefit under 35 U.S.C. § 119 (e) of U.S. Provisional Patent Application No. 62/746,131, filed Oct. 16, 2018, each of which is hereby incorporated by reference in its entirety.

FIELD

The present invention generally relates to compositions comprising a binder and a powder, and associated methods.

BACKGROUND

Powder metallurgical (PM) processes are methods by which materials or components are formed from metal powders. Methods involving the use of metal powders to form parts may significantly reduce or eliminate metal removal processes in the forming of the part, increasing energy efficiency of manufacture relative to machining and related processes.

Additive manufacturing of a metallic powder is an example of a PM process. Additive manufacturing processes are widely used to build three-dimensional objects through successive addition of thin layers of material. For example, binder jetting is an additive manufacturing technique based on the use of a binder to join particles of a powder (e.g., a metallic powder) to form a three-dimensional object. In a binder jetting process, one or more liquids (e.g., a binder formulation, components of a binder system, solvents which interact with a binder in the powder) are jetted from a print head onto successive layers of powder in a powder bed in a predetermined pattern. The layers of the powder and the binder adhere to one another to form a three-dimensional "green" part, and through subsequent processing, such as removal of the binder and sintering, the "green" part can be formed into a final three-dimensional part.

The use of a binder in PM processes (e.g., additive manufacturing) may improve process steps and/or characteristics such as dusting and segregation characteristics of powder mixes, pressing and ejection of parts, bonding, lubrication, green strength, green density, and uniformity of sintered parts. Additionally, utilizing a binder formulation for PM processing has advantages over previous processes that relied on a porous metal as a framework to build metal parts, in that a pure metal part can be created using a process with a binder formulation, since the binder components can be removed using heat processing, whereas the porous metal framework would remain in the finished metal part. It is a challenge to find materials combinations of binder with metal powder, and methods of processing the combinations, that result in advantageous characteristics.

Accordingly, improved compositions, that comprise a metal powder and a binder, and methods are desired.

SUMMARY

Compositions comprising a binder and a powder, and associated methods are described herein.

According to one aspect, a composition is provided. In some embodiments, the composition comprises a polymer. In some embodiments, the composition comprises a binder formulation. In some embodiments, the binder formulation comprises a first liquid and a polymer. In some embodiments, the polymer comprises a nitrogen-containing repeat unit. In some embodiments, the composition comprises a metal powder. In some embodiments, the composition comprises: a polymer; and a metal powder; wherein the polymer comprises a nitrogen-containing repeat unit.

In some embodiments, a composition comprises a plurality of metal particles embedded in a polymer comprising a nitrogen-containing repeat unit. The plurality of metal particles are present in the composition in an amount of greater than or equal to 40 wt % and less than or equal to 99.7 wt %. The composition has a transverse rupture strength of greater than or equal to 5 MPa and less than or equal to 100 MPa.

According to another aspect, a method is provided. In some embodiments, the method comprises combining a metal powder with a binder formulation. In some embodiments, the binder formulation comprises a first liquid and a polymer. In some embodiments, the polymer comprises a nitrogen-containing repeat unit. In some embodiments, the method comprises combining a metal powder with a binder formulation; where the binder formulation comprises a first liquid and a polymer; and where the polymer comprises a nitrogen-containing repeat unit.

In some embodiments, a method for additive manufacturing is provided. In some embodiments, the method comprises spreading a layer of a metallic base powder across a powder bed; jetting a fluid to the layer along a controlled two-dimensional pattern associated with the layer, the fluid including a first liquid and a polymer including a nitrogen-containing repeat unit; for each layer of a plurality of layers, repeating the steps of spreading a respective layer of the metallic base powder and jetting the fluid to the respective layer to form a three-dimensional green part; and for each layer of a plurality of layers, repeating the steps of spreading a respective layer of the metallic base powder and jetting the fluid to the respective layer to form a three-dimensional green part.

In some embodiments, a method of fabricating a metal part through additive manufacturing comprises depositing a binder formulation onto a powder layer comprising a plurality of metal particles to form a composite layer, curing the composite layer, and heating the cured composite layer such that at least a portion of the binder formulation is removed from the cured composite layer. The binder formulation comprises a polymer comprising a nitrogen-containing repeat unit.

In some embodiments, a method of fabricating a metal part through additive manufacturing comprises depositing a binder formulation onto a powder layer comprising a plurality of metal particles. The binder formulation comprises a polymer present in the composition in an amount of greater than or equal to 5 wt % and less than or equal to 50 wt % and comprises water. The polymer comprises a nitrogen-containing repeat unit.

According to another aspect, a binder formulation for use in additive manufacturing is provided. The binder formulation comprises a polymer comprising a nitrogen-containing repeat unit in an amount of between or equal to 5 wt % and 50 wt % and water. The binder formulation is configured, in the presence of heat, to form a composition with a metal powder.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
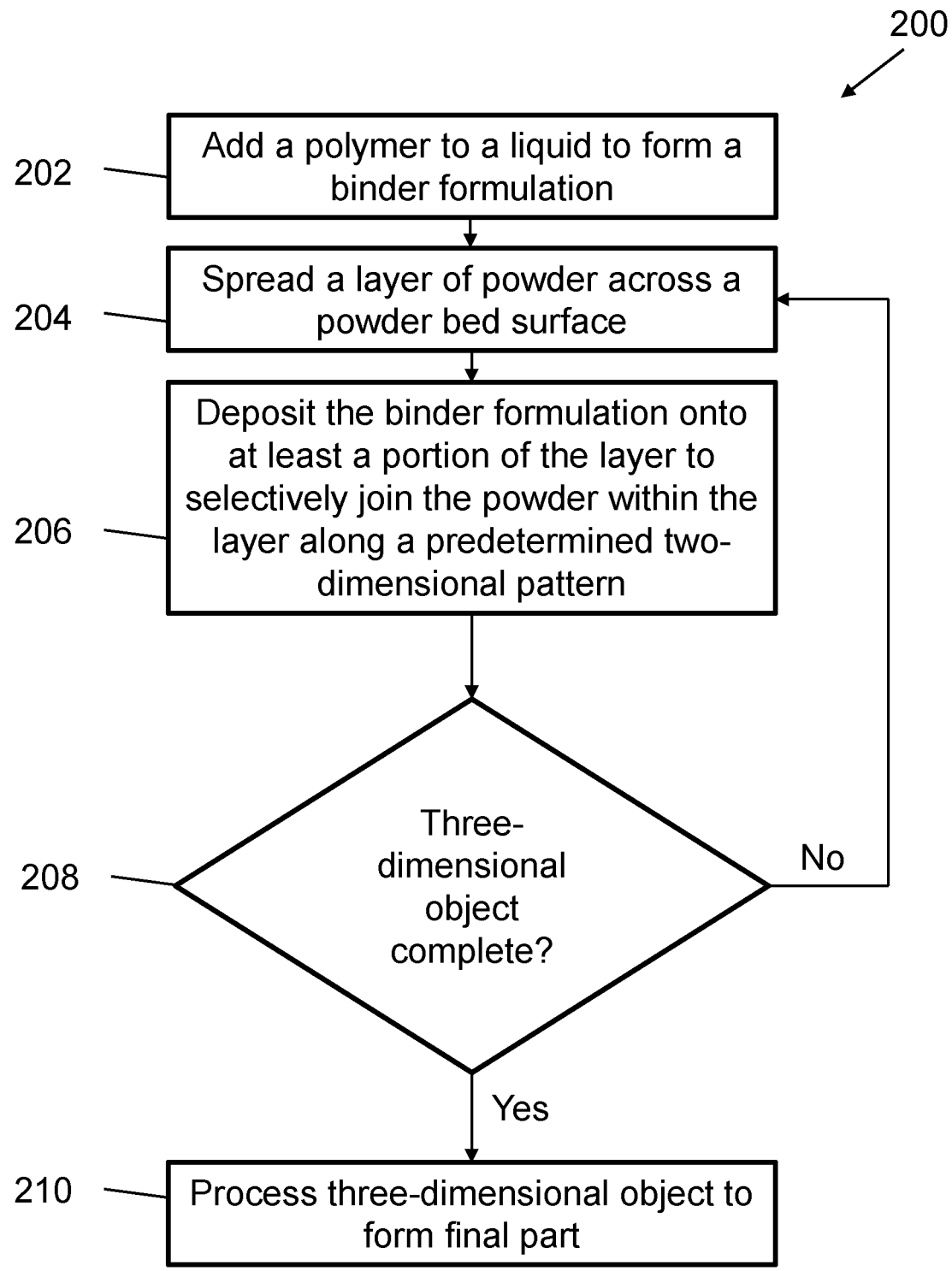
FIG. 1 is a flow chart depicting a method for additive manufacturing, according to some embodiments.

Compositions comprising a binder and a powder, and associated methods are described herein. The inventors have recognized and appreciated that the material characteristics and/or chemical characteristics of a binder and/or binder formulation used in a powder metallurgical process (e.g., a powder-based additive manufacturing process, a method of fabricating a metal part through additive manufacturing) can have a significant impact on the performance of the process and the quality of the manufactured parts. For example, the adhesion properties of at least one component (e.g., a polymer) of a binder formulation to a powder (e.g., metal powder) can impact the ability to form strong pre-sintered parts (also referred to herein as "green" parts). In particular, poor adhesion between a polymer binder and a metal powder may result in a pre-sintered part without enough strength for the part to be handled, making the process of forming a final part more difficult. For example, conventional binder formulations may provide adequate strength of pre-sintered parts including steel powders, but may not provide adequate strength of pre-sintered parts including other powder materials. In addition, the viscosity of a binder formulation can impact the ability of the binder formulation to jet and spread evenly onto a metal powder bed, in the case of binder jetting, which in turn can affect ability to control the shape and homogeneity of the final printed part. In particular, a viscosity above a certain threshold may preclude the ability to jet the binder formulation or increase the heterogeneity of jetting. The viscosity of the binder formulation may impact the flow characteristics of a binder-powder mixture in an injection molding process. In particular, a lower viscosity increases the rate at which the mixture can be injected into the mold.

In view of the foregoing, the inventors have appreciated advantages associated with compositions and processes for powder metallurgical processing (e.g., a binder jetting process, a method of fabricating a metal part through additive manufacturing) in which a binder formulation comprising a water-soluble polymer comprising a nitrogen-containing repeat unit is combined with a metal powder to facilitate control over the mechanical properties of a pre-sintered part. The water-soluble polymer comprising a nitrogen-containing repeat unit may enhance the adhesion properties with the metal powder such that a pre-sintered part comprising the nitrogen-containing water-soluble polymer in the metal powder has a greater strength as compared to a pre-sintered parts comprising the metal powder and a water-soluble polymer without a nitrogen-containing repeat unit. For example, the electron-donating nitrogen along the polymer chains improves adhesion to metal powders relative to water-soluble polymers that do not contain nitrogen, thereby increasing the strength of a resulting pre-sintered part. This enhanced strength may result in an improved ability to handle the pre-sintered part, which may improve the quality of the process and manufactured part. Moreover, the inventors have recognized that binder formulations comprising a water-soluble polymer comprising a nitrogen-containing repeat unit may be particularly suitable for certain powder metallurgical processes, such as those processes involving metal powders comprising copper or a noble metal. In some embodiments, the binder formulations that enhance the mechanical characteristics of a pre-sintered part without interfering with other aspects of a powder metallurgical process. Non-limiting applications of the compositions and binder formulation powder metallurgical processes disclosed herein include jewelry, catalysis, and biomedical applications.

As mentioned above, according to some aspects, a composition is provided. Compositions provided herein may comprise one or more of a polymer, a binder formulation, and/or a powder (e.g., a metal powder). Compositions herein may or may not comprise a liquid.

In some embodiments, a composition comprises a polymer. The polymer generally acts as a binder (e.g., to hold powder particles together to form an object comprising the binder and the powder particles). As used herein, a "binder" may be a substance that holds other materials together by chemical interactions (e.g., adhesion, cohesion, hydrogen bonding, metallic bonding, dipole-dipole interactions, Van der Waals forces, electrostatic interactions) between the binder and the other materials. In some embodiments, it may be preferred that the polymer comprises a nitrogen-containing repeat unit. As used herein, a "nitrogen-containing repeat unit" may be a repeat unit located within a polymer chain having one or more nitrogen atoms.

A polymer described herein may comprise polymer chains having any suitable architecture. In some embodiments, a polymer comprises a homopolymer having a single type of repeat unit. In some embodiments, the polymer comprises a homopolymer, wherein each repeat unit of the homopolymer is a nitrogen-containing repeat unit. In some embodiments, a polymer comprises a copolymer having more than one type of repeat unit. In some embodiments, the polymer comprises a copolymer (e.g., a statistical copolymer, a block copolymer, a gradient copolymer), wherein at least 40% (e.g., at least 50%) of the repeat units of the copolymer are nitrogen-containing repeat units. In some embodiments, at least 50%, at least 60%, or at least 70% of the repeat units of the copolymer are nitrogen-containing repeat units. In some embodiments, at most 100%, at most 90%, or at most 80% of the repeat units of the copolymer are nitrogen-containing repeat units. Combinations of the above-referenced ranges are also possible (e.g., between or equal to 50% and 100%, between or equal to 60% and 90%, between or equal to 70% and 80%). Other ranges are also possible. In some cases, 100% of the repeat units of the copolymer are nitrogen-containing repeat units. The remainder of the repeat units of the copolymer may comprise nitrogen-free repeat units. In some embodiments, the polymer is a copolymer comprising two or more nitrogen-containing repeat units. In some embodiments, the polymer is a polymer blend of one or more homopolymers, one or more copolymers, and/or a combination thereof.

In some embodiments, the polymer comprises the following structure:

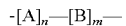

wherein [A] is a nitrogen-containing repeat unit or a combination of nitrogen-containing repeat units and [B] is a nitrogen-free repeat unit or a combination of nitrogen-free repeat units, n>0.5, and n+m=1. As used herein, a "nitrogen-free repeat unit" may be a repeat unit having no nitrogen atoms, wherein the repeat unit is located within a polymer chain.

A nitrogen-containing repeat unit may have any suitable chemical structure, for example, so as to impart desired solubility or polarity characteristics of the polymer chain. In some embodiments, the nitrogen-containing repeat unit is a repeat unit having a nitrogen-containing side group, a nitrogen-containing backbone, or a suitable combination thereof. The nitrogen-containing side group may comprise a primary amine, a secondary amine, a tertiary amine, an amide, an imide, a urethane, a urea, or a nitrogen-containing heterocyclic moiety. The nitrogen-containing backbone may comprise a peptide bond, an amine, an amide, an imide, a urethane, a urea, or a nitrogen-containing heterocyclic moiety.

A nitrogen-containing repeat unit may be a repeat unit of any suitable class of nitrogen-containing polymers. In some embodiments, the nitrogen-containing repeat unit is a repeat unit of a polypeptide, a protein (e.g., collagen, gelatin), a polyacrylamide, a glycosaminoglycan (e.g., hyaluronic acid), a polyvinyl lactam (e. g. polyvinyl pyrrolidone, poly vinyl caprolactam), a polyoxazoline, a poly(aminoalkyl acrylate), a poly(aminoalkyl methacrylate), a poly(amidoamine), a melamine resin, a polyamide, or a polyimide. For example, the nitrogen-containing repeat unit may be a repeat unit of polyvinylpyrrolidone, chitosan, collagen, gelatin, poly(2-(diethylamino)ethyl methacrylate), polyacrylamide, poly(N-isopropylacrylamide), N-(2-hydroxypropyl) methacrylamide (HPMA), hyaluronic acid (HA), polyvinylcaprolactam, poly(2-ethyl-2-oxazoline), melamine, or polycaprolactam.

A nitrogen-free repeat unit may be a repeat unit of any suitable class of nitrogen-free polymers. In some embodiments, the nitrogen-free repeat unit is a repeat unit of an acrylate polymer, or a repeat unit of a vinyl polymer comprising nitrogen-free repeat units comprising an ester. In some embodiments, the nitrogen-free repeat unit comprises an alkyl, an aryl, a hydroxyl group, or a heterocyclic group. In some embodiments, the nitrogen-free repeat unit was formed from a difunctional repeat unit, such as a diacid, configured to react and form a repeat unit of a condensation polymer. For example, the nitrogen-free repeat unit may be a repeat unit of polyvinyl acetate, poly(acrylic acid), poly (methacrylic acid), poly(2-hydroxyethyl acrylate), poly (methyl methacrylate), polyvinyl alcohol, polyhydroxystyrene, maleic acid, or adipic acid.

In some embodiments, the polymer is a biologically derived polymer such as chitosan, chitosan oligosaccharide, collagen, gelatin, collagen hydrolysate, or hyaluronic acid (HA). In some embodiments, the polymer is a synthetic polymer such as polyvinylpyrrolidone, poly(2-(diethylamino)ethyl methacrylate), polyacrylamide, poly(N-isopropylacrylamide), or N-(2-hydroxypropyl) methacrylamide (HPMA).

Polymers described herein generally have a weight-average molecular weight in a range suitable for the powder process application. In some embodiments, a polymer has a weight-average molecular weight low enough such that the desired viscosity of a binder formulation can be achieved and/or high enough that a desired mechanical strength of a green part in a powder process (e.g., powder metallurgical process) can also be achieved. For example, in a binder jetting process, the polymer has a weight-average molecular weight in a range low enough such that the binder formulation has a viscosity suitable for jetting the binder formulation, but high enough that the resulting three-dimensional object has sufficient strength to be handled. In some such embodiments, the binder formulation having these properties may include a sufficient amount of binder (e.g., polymer) to hold a metal powder together in a resulting composition comprising the metal powder and the binder.

In some embodiments, the polymer has a weight-average molecular weight of at least 1 kiloDalton (kDa), at least 2 kDa, or at least 3 kDa. In some embodiments, the polymer has a weight-average molecular weight of at most 40 kDa, at most 30 kDa, at most 20 kDa, or at most 15 kDa. Combinations of the above-referenced ranges are also possible (e.g., between or equal to 1 kDa and 40 kDa, between or equal to 1 kDa and 15 kDa, between or equal to 2 kDa and 20 kDa, between or equal to 2 kDa and 15 kDa, between or equal to 3 kDa and 15 kDa). Other ranges are also possible. In certain embodiments, it may be preferred that the polymer has a weight-average molecular weight of between or equal to 2 kDa and 20 kDa. In certain embodiments, it may be preferred that the polymer has a weight-average molecular weight of between or equal to 3 kDa and 15 kDa. In certain embodiments, the polymer is polyvinylpyrrolidone with a weight-average molecular weight of around 10 kDa. In certain embodiments, the polymer is chitosan oligosaccharide with a weight-average molecular weight of around 5 kDa, around 2 kDa, or around 1 kDa. In certain embodiments, the polymer is collagen hydrolysate with a weight-average molecular weight of around 5 kDa. Weight-average molecular weight may be determined for example by intrinsic viscosity measurements or gel permeation chromatography with suitable standards, using conventional methods.

In some embodiments, a composition comprises a binder formulation, in which a polymer described herein is combined with a first liquid (e.g., water; e.g., a solvent) and optionally one or more other components. In some embodiments, a binder formulation additionally comprises one or more other components including but not limited to a second liquid (e.g., a co-solvent) and/or an additive (e.g., a biocide, a surfactant). The binder formulation may be configured to form a composition (e.g., a "brown" part, as described in further detail below) with a metal powder. For instance, the binder formulation may be configured to do so in the presence of heat and/or upon exposure to heat (e.g., and as also described in further detail below, upon exposure to a first heating temperature, during a curing process).

A binder formulation generally has a weight percent of polymer in a range suitable for the powder process application. In some embodiments, a binder formulation has a weight percent of polymer low enough such that the desired viscosity of a binder formulation can be achieved, e.g., for extrusion (e.g., for injection molding) or for jetting (e.g., for binder jetting). In some embodiments, the binder formulation has a weight percent (wt %) of polymer of at least 5 wt %, at least 7 wt %, at least 10 wt %, or at least 15 wt % of polymer relative to the total weight of the binder formulation. In some embodiments, the binder formulation has a weight percent (wt %) of polymer of at most 50 wt %, at most 40 wt %, or at most 30 wt % of polymer relative to the total weight of the binder formulation. Combinations of the above-referenced ranges are also possible (e.g., between or equal to 5 wt % and 50 wt %, between or equal to 7 wt % and 50 wt %, between or equal to 10 wt % and 40 wt %, between or equal to 15 wt % and 40 wt %, or between or equal to 15 wt % and 30 wt % of polymer). Other ranges are also possible. For example, during a heating step described herein for heating a composition described herein, a binder formulation in a composition may comprise up to 99.9 wt % of polymer once all of the liquid has nearly been removed. In some embodiments, the balance of the binder formulation comprises a first liquid, a second liquid, and/or an additive, or a combination thereof. Weight percent of polymer in a binder formulation may be determined by thermogravimetric analysis.

A binder formulation generally comprises a first liquid. In certain embodiments, it may be preferred that the first liquid comprises water. The use of water as a first liquid in a binder formulation may present advantages for manufacturing, including minimization of health and environmental and safety hazards of powder processing with the binder formulation (e.g., additive manufacturing processing with the binder formulation) and a reduced cost of engineering protection to control set hazards, relative to other liquids. It should be understood that the current disclosure is not limited to aqueous binder formulations. In some embodiments, the first liquid comprises methanol, ethanol, isopropanol, propylene diol, diglyme, ethyl lactate, propylene glycol monomethyl ether acetate, propylene glycol methyl ether, or ethylene glycol monomethyl ether.

In some embodiments, the first liquid solubilizes the polymer to an extent sufficient to form a solution, such that the binder formulation is a solution comprising the polymer, and the solution can be processed, e.g., by extrusion or jetting. As used herein, the term "solution" may refer to a homogeneous mixture comprising two or more substances in which one substance (e.g., polymer) is homogeneously distributed in the other (e.g., first liquid). In some embodiments, the first liquid acts as a solvent to the polymer. The polymer may be soluble in the first liquid, such that combining the first liquid with the polymer results in a solution of the polymer in the first liquid. In some embodiments, the first liquid can dissolve the polymer in an amount of at least 1 wt %, at least 5 wt %, at least 10 wt % or at least 15 wt %. In some embodiments, the first liquid can dissolve the polymer in an amount of at most 50 wt %, at most 40 wt %, or at most 30 wt %. Combinations of the above-referenced ranges are also possible (e.g., between or equal to 1 wt % and 50 wt %, between or equal to 5 wt % and 50 wt %, between or equal to 10 wt % and 40 wt %, or between or equal to 15 wt % and 30 wt % of polymer). Other ranges are also possible.

A polymer that dissolves in water at a concentration of at least 1 wt % is also referred to herein as a "water-soluble polymer".

In some embodiments, at least a portion of the polymer in the first liquid remains undissolved. In some embodiments, the first liquid suspends the polymer to an extent sufficient to form a suspension, such that the binder formulation is a suspension comprising the polymer. As used herein, the term "suspension" may refer to a heterogeneous mixture that contains a liquid and solid particles or molecules that can separate from the liquid by sedimentation over time.

A binder formulation generally has a weight percent of a first liquid in a range suitable for a powder process application. In some embodiments, a binder formulation has a weight percent of first liquid high enough such that the desired viscosity of a binder formulation can be achieved, e.g., for extrusion (e.g., for injection molding) or for jetting (e.g., for binder jetting). In some embodiments, the binder formulation has a weight percent (wt %) of first liquid of at least 50 wt %, at least 60 wt %, or at least 70 wt % of first liquid relative to the total weight of the binder formulation. In some embodiments, the binder formulation has a weight percent (wt %) of at most 95%, at most 90 wt %, at most 85 wt %, or at most 80 wt % of first liquid relative to the total weight of the binder formulation. Combinations of the above-referenced ranges are also possible (e.g., between or equal to 50 wt % and 95 wt %, between or equal to 60 wt % and 90 wt %, between or equal to 70 wt % and 85 wt %, or between or equal to 70 wt % and 80 wt %). Other ranges are also possible.

In some embodiments, the binder formulation optionally comprises a second liquid. The second liquid may act as a co-solvent to the polymer, to increase the solubility of the polymer in the binder formulation. In some embodiments, the second liquid comprises an organic solvent, e.g., a water-soluble organic solvent. In some embodiments, the second liquid comprises a plurality of organic solvents. Non-limiting classes of organic solvents include alcohols, diols, triols, ketones, or esters. Non-limiting examples of alcohols (e.g., water-soluble alcohols) include ethanol, isopropyl alcohol, and 1-propanol. Non-limiting examples of diols (e.g., water-soluble diols) include ethylene glycol, propylene glycol, 1-(1-hydroxypropoxy)propan-1-ol (CAS-25265-71-8), 1-(2-hydroxypropoxy)propan-2-ol, 3,3'-oxybis(propan-1-ol), and dipropylene glycol (a mixture of isomers 1-(1-hydroxypropoxy)propan-1-ol (CAS-25265-71-8), 1-(2-hydroxypropoxy)propan-2-ol, and 3,3'-oxybis(propan-1-ol)). Non-limiting examples of triols (e.g., water-soluble triols) include glycerol and 1,2,4-butanetriol. Non-limiting examples of ketones (e.g., water-soluble ketones) include acetone and butanone. A non-limiting example of an ester is ethyl acetate.

A binder formulation generally has a weight percent of a second liquid in a range suitable for a powder process application. In some embodiments, a binder formulation has a weight percent of second liquid high enough such that the binder formulation has fully suspended or solubilized the polymer for ease of processing, e.g., for extrusion or for jetting. In some embodiments, the binder formulation has a weight percent (wt %) of second liquid of at least 0 wt %, at least 2 wt %, or at least 4 wt % of second liquid relative to the total weight of the binder formulation. In some embodiments, the binder formulation has a weight percent (wt %) of second liquid of at most 20 wt %, at most 15 wt %, at most 10 wt %, or at most 5 wt % of second liquid relative to the total weight of the binder formulation. Combinations of the above-referenced ranges are also possible (e.g., between or equal to 0 wt % and 20 wt %, between or equal to 0 wt % and 15 wt %, between or equal to 0 wt % and 10 wt %, between or equal to 2 wt % and 20 wt %, between or equal to 2 wt % and 10 wt %, between or equal to 0 wt % and 5 wt %, between or equal to 2 wt % and 5 wt %, or between or equal to 4 wt % and 5 wt %). Other ranges are also possible. In certain embodiments, the binder formulation comprises between or equal to 0 wt % and 5 wt % of second liquid relative to the total weight of the binder formulation.

In some embodiments, the binder formulation comprises an additive. An "additive," as used herein, may be a substance included as a component of a binder formulation to improve one or more properties of the binder formulation and/or preserve the binder formulation against degradation. Suitable additives to a binder formulation include but are not limited to surfactants, biocides, defoamers, adhesion promoters, or corrosion inhibitors. Further examples of suitable additives include wetting agents, flow improvers, coatings, and other powder modifications found to be useful in the sintering or infiltration of additively fabricated parts.

In some embodiments, the additive comprises a surfactant. A surfactant may be included in a binder formulation to decrease the surface tension of the binder formulation (air-formulation surface tension) to improve jetting performance, and/or to improve powder spreading performance. While both ionic surfactants and non-ionic surfactants can be used, surfactants that do not contain such elements as sulfur, phosphorus, silicon, or metals may be preferred. Non-limiting examples of surfactants include Thetawet FS-8150, Polyoxyl 35 castor oil (CAS #61791-12-6), Lauryldimethylamine oxide (CAS #1643-20-5), Triton X-100 (CAS #9002-93-1), Surfynol 440 (CAS-9014-85-1), Surfynol 2502 (CAS-182211-02-5), and Dynol 604 (CAS-169117-72-0).

In some embodiments, the additive comprises a biocide. A biocide may be included in a binder formulation to prevent growth of biological matter (e.g., bacteria, yeast) in the binder formulation and/or to prevent enzymatic degradation of a polymer in the binder formulation. Biologically derived polymers such as chitosan and gelatin may be particularly vulnerable to enzymatic degradation in the absence of a biocide. In some embodiments, the biocide is a microbicide and/or a fungicide (is configured to kill bacteria and/or fungi). Non-limiting examples of biocides include 1,2-benzisothiazolin-3-one, 4,5-Dichloro-2-octyl-4-isothiazolin-3-one, Lauryldimethylamine oxide (CAS #1643-20-5), Benzalkonium chloride, 2-n-Octyl-4-Isothiazolin-3-One, 3-(3,4-dichlorophenyl)-1,1-dimethylure, 2-bromo-2-nitropropane-1,3-diol, and Rotenone (CAS #83-79-4).

In some embodiments, the binder formulation comprises an additive composition. As additive composition herein comprises an additive and optionally one or more additional components (e.g., a liquid, a solvent). Non-limiting examples of additive compositions include Thetawet 8150 (supplied by Innovative Chemical Technologies, Inc. at 103 Walnut Grove Rd, Cartersville, GA 30120), ProxelGXL (20% aqueous dipropylene glycol solution of 1,2-benzisothiazolin-3-one), methylisothiazolinone, 4,5-Dichloro-2-octyl-4-isothiazolin-3-one, Lauryldimethylamine oxide (CAS #1643-20-5), Benzalkonium chloride, 2-n-Octyl-4-Isothiazolin-3-One, 3-(3,4-dichlorophenyl)-1,1-dimethylure, 2-bromo-2-nitropropane-1,3-diol, Rotenone (CAS #83-79-4), Thetawet-8150, Polyoxyl 35 castor oil (CAS #61791-12-6), Lauryldimethylamine oxide (CAS #1643-20-5), Triton X-100 (CAS #9002-93-1), Surfynol 440 (CAS-9014-85-1), Surfynol 2502 (CAS-182211-02-5), and Dynol 604 (CAS-169117-72-0).

An additive (e.g., biocide, surfactant) may be present in a binder formulation in any suitable amount. In some embodiments, the binder formulation has a weight percent (wt %) of additive of at most 1 wt %, at most 0.5 wt %, or at most 0.25 wt % of additive relative to the total weight of the binder formulation. In some embodiments, the binder formulation has a weight percent (wt %) of additive of at least 0 wt %, at least 0.1 wt %, or at least 0.2 wt % of additive relative to the total weight of the binder formulation. Combinations of the above-referenced ranges are also possible (e.g., between or equal to 0 wt % and 1 wt %, between or equal to 0 wt % and 0.5 wt %, between or equal to 0.1 wt % and 0.5 wt %, between or equal to 0 wt % and 0.25 wt %, between or equal to 0.1 wt % and 0.25 wt %, or between or equal to 0.2 wt % and 0.5 wt %). Other ranges are also possible. In some embodiments, the binder formulation comprises between or equal to 0 wt % and 0.5 wt % of a surfactant relative to the weight of the entire binder formulation. In some embodiments, the binder formulation comprises between or equal to 0 wt % and 0.25 wt % of a biocide relative to the weight of the entire binder formulation.

In certain embodiments, the binder formulation comprises between or equal to 5 wt % and 50 wt % of polymer, between or equal to 50 wt % and 95 wt % of first liquid, between or equal to 0 wt % and 10 wt % of second liquid, and between or equal to 0 wt % and 0.5 wt % of additive. In certain embodiments, the binder formulation comprises between or equal to 15 wt % and 30 wt % of polymer, between or equal to 70 wt % and 85 wt % of first liquid, between or equal to 0 wt % and 10 wt % of second liquid, and between or equal to 0 wt % and 0.5 wt % of additive. It should be understood that the binder formulation could include a number of other components, as the current disclosure is not limited in this regard.

The binder formulation generally has properties suited to the powder processing application. One of the properties of the binder formulation of relevance to powder processing is viscosity. The weight-average molecular weight of the polymer, the weight percent of the polymer in the binder formulation, and other contributing factors can be selected to tailor the viscosity of the binder formulation to the powder processing application. For example, the binder formulation can be selected to have a viscosity that is within the specifications of a particular print head (e.g., inkjet print head) used in an additive manufacturing process (e.g., three-dimensional (3D) printing process). In some embodiments, the viscosity of the binder formulation is at least 3 centiPoise (cP), at least 3.5 cP, or at least 4 cP. In some embodiments, the viscosity of the binder formulation is at most 30 cP, at most 15 cP, or at most 7 cP. Combinations of the above-referenced ranges are also possible (e.g., between or equal to 3.5 cP and 30 cP, between or equal to 3.5 cP and 15 cP, between or equal to 4 cP and 15 cP, or between or equal to 4 cP and 7 cP). Other ranges are also possible. For example, during a heating step described herein for forming a self-supporting composite, the viscosity of the binder formulation may increase well above the ranges described and then a solid may form, making the viscosity measurement irrelevant. In certain embodiments, it may be preferred that the viscosity of the binder formulation be between or equal to 4 cP and 6 cP. Viscosity of a binder formulation may be determined using a spindle viscometer, a cone-and-plate viscometer, or a capillary viscometer, using conventional methods.

Another property of the binder formulation of relevance to powder processing is surface tension. Surface tension is measured for the binder formulation (air-formulation surface tension) at normal temperature and pressure (20 degrees Celsius and 1 atm). The binder formulation generally has a surface tension suitable to the powder process application, e.g., suitable to jetting in an additive manufacturing process. As discussed, a surfactant may be used to decrease the surface tension of the binder formulation. In some embodiments, the binder formulation has a surface tension of at most 80 dynes per centimeter (dyn/cm), at most 74 dyn/cm, at most 70 dyn/cm, or at most 60 dyn/cm. In some embodiments, the binder formulation has a surface tension of at least 20 dyn/cm, at least 30 dyn/cm, or at least 40 dyn/cm. Combinations of the above-referenced ranges are also possible (e.g., between or equal to 20 dyn/cm and 80 dyn/cm, between or equal to 30 dyn/cm and 70 dyn/cm, between or equal to 40 dyn/cm and 74 dyn/cm, between or equal to 40 dyn/cm and 60 dyn/cm). Other ranges are also possible. Surface tension of a binder formulation may be determined using such conventional methods and instruments as goniometry, a Du Noüy Ring Tensiometer method, a Wilhelmy Plate Tensiometer method, a Du Noüy-Padday method, or a bubble pressure tensiometer method.

In some embodiments, a composition comprises a powder. As used herein, a "powder" may be a collection of solid particles that are between or equal to 1 micron and 1 mm in size (e.g., having a D50 value according to ASTM E2651-13 of between or equal to 1 micron and 1 mm). Depending on the particular embodiment, the powder may comprise any suitable metallic and/or ceramic components. In certain embodiments, the powder comprises a metal powder. As used herein, a "metal powder" may be a powder which comprises particles that comprise a metal. In some embodiments, the metal powder comprises particles that comprise a plurality of metals (e.g., particles comprise an alloy of two or more metals). In certain embodiments, it may be preferred that the metal powder comprises a noble metal. In some embodiments, the powder comprises a metal oxide (e.g., alumina, silica). In certain embodiments, it may be preferred that the composition comprises a polymer comprising a nitrogen-containing repeat unit and a metal powder comprising a noble metal, due to the favorable adhesion interactions between the nitrogen of the polymer and the noble metal of the metal powder. It should be understood that other modes of favorable adhesion interactions between polymer and powder are possible, as the current disclosure is not limited is this regard.

As used herein, the "noble metals" are ruthenium (Ru), rhodium (Rh), palladium (Pd), silver (Ag), osmium (Os), iridium (Tr), platinum (Pt), and gold (Au).

In some embodiments, the metal powder comprises a transition metal. The "transition metal" elements are scandium (Sc), yttrium (Y), lanthanum (La), actinium (Ac), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), manganese (Mn), technetium (Tc), rhenium (Re), bohrium (Bh), iron (Fe), ruthenium (Ru), osmium (Os), hassium (Hs), cobalt (Co), rhodium (Rh), iridium (Ir), meitnerium (Mt), nickel (Ni), palladium (Pd), platinum (Pt), darmstadtium (Ds), copper (Cu), silver (Ag), gold (Au), roentgenium (Rg), zinc (Zn), cadmium (Cd), mercury (Hg), and copernicium (Cn).

In certain embodiments, particles of the metal powder comprise at least one of silver, gold, or platinum. In certain embodiments, it may be preferred that particles of the metal powder consist essentially of a metal or alloy comprising at least one of silver, gold, or platinum, such that a pure noble metal object may result from powder processing with a binder formulation described herein. In certain embodiments, the metal powder comprises copper. It should be understood that any suitable metal can be used in the metal powder, as the current disclosure is not limited in this regard.

The powder (e.g., the metal powder) generally has a suitable particle size (e.g., number-average particle size as measured according to ASTM E2651-13) for powder processing. In some embodiments, the powder has a D50 of at least 1 micron, at least 5 microns, or at least 7 microns. In some embodiments, the powder has a D50 of at most 50 microns, at most 40 microns, or at most 20 microns. Combinations of the above-referenced ranges are also possible (e.g., between or equal to 1 micron and 50 microns, between or equal to 5 microns and 50 microns, between or equal to 7 microns and 40 microns, or between or equal to 7 microns and 20 microns). Other ranges are also possible. In certain embodiments, it may be preferred that the powder have a D50 of between or equal to 7 microns and 20 microns. D50 may be measured according to ASTM E2651-13.

In some embodiments, a composition (e.g., comprising a polymer and/or binder formulation and a powder) comprises a suitable weight percent of powder (e.g., metal powder, metal particles). In some embodiments, the composition comprises at least 40 wt %, at least 50 wt %, at least 60 wt %, at least 70 wt %, at least 80 wt %, at least 90 wt %, at least 94 wt %, at least 95 wt %, at least 96 wt %, at least 97 wt %, at least 98 wt %, at least 98.5 wt %, at least 99 wt %, at least 99.25 wt %, at least 99.5 wt %, at least 99.6 wt %, or at least 99.7 wt % of powder relative to the total weight of the composition. In some embodiments, the composition comprises at most 99.7 wt %, at most 99.6 wt %, at most 99.5 wt %, at most 99.25 wt %, at most 99 wt %, at most 98.5 wt %, or at most 98 wt % of powder relative to the total weight of the composition. Combinations of the above-referenced ranges are also possible (e.g., between or equal to 40 wt % and 99.7 wt %, between or equal to 40 wt % and 99.6 wt %, between or equal to 60 wt % and 99 wt %, between or equal to 70 wt % and 99 wt %, between or equal to 94 wt % and 98 wt %, between or equal to 98 wt % and 99.6 wt %, between or equal to 98 wt % and 99.7 wt %). Other ranges are also possible. For example, in some embodiments where the composition is present during a binder jetting process, the composition comprises between or equal to 70 wt % and 99 wt % of powder (e.g., between or equal to 94 wt % and 98 wt % of powder) or between or equal to 98 wt % and 99.7 wt % of powder, relative to the total weight of the composition. For example, in some embodiments where the composition is present at a time during an injection molding process, the composition comprises between or equal to 50 wt % and 99 wt % of powder or between 98 wt % and 99.7 wt % of powder, relative to the total weight of the composition. In certain embodiments, the balance of the composition comprises a polymer and/or a binder formulation. Weight percent of powder (e.g., metal powder) in a composition may be determined by thermogravimetric analysis.

When a composition comprises both a powder and a polymer, the powder and the polymer may be arranged with respect to each other in a variety of suitable manners. In some embodiments, the powder is embedded in the polymer. As an example, the polymer may form a matrix in which the powder is disposed. As another example, the polymer may coat the surfaces of the powder. As a third example, particles making up a powder may be in topological contact with each other through the polymer. When a powder is embedded in a polymer, it should be understood that the powder may comprise some particles that are partially but not fully embedded therein. Such particles may be at an external surface of the composition. For instance, a powder may comprise some particles with a surface uncovered by the polymer and/or that protrude from a polymeric matrix in which other particles are disposed. Such particles may also comprise a surface coated by the polymer (e.g., a surface facing the interior of the composition).

It should be understood that the composition could include a number of components beyond a powder, a polymer, and/or a binder formulation, as the current disclosure is not limited in this regard.

In another aspect, methods involving combining a powder described herein with a polymer and/or a binder formulation described herein (e.g., for a powder process) are provided. In some embodiments, a method is an additive manufacturing method (e.g., a 3-dimensional (3D) printing method, a method of fabricating a metal part through additive manufacturing). It should be understood that the current disclosure is not limited to additive manufacturing methods and other manufacturing methods may be used (e.g., injection molding methods).

An additive manufacturing method may comprise forming a three-dimensional object comprising a composition described herein (e.g., comprising a binder formulation and a powder), in a powder bed. The method may involve heating a three-dimensional object to convert the three-dimensional object into a self-supporting binder-powder composite, also referred to herein as a "brown" part. This step may be referred to as a "curing" step. In some embodiments, performing a "curing" step on a composite layer (and/or a three-dimensional object comprising a composite layer) may result in the formation of a "cured" composite layer and/or a "composite material". The method may then involve heating a "brown" part to remove the binder and to produce a pre-sintered part. A pre-sintered part may be heated to sinter particles of the powder together to produce a final part. In certain embodiments, it may be preferred that a final part is fully dense. As used herein, the term "fully dense" may refer to a relative density of the final part, relative to the density of the material of which the powder consists, of at least 95%.

Figure 3A:
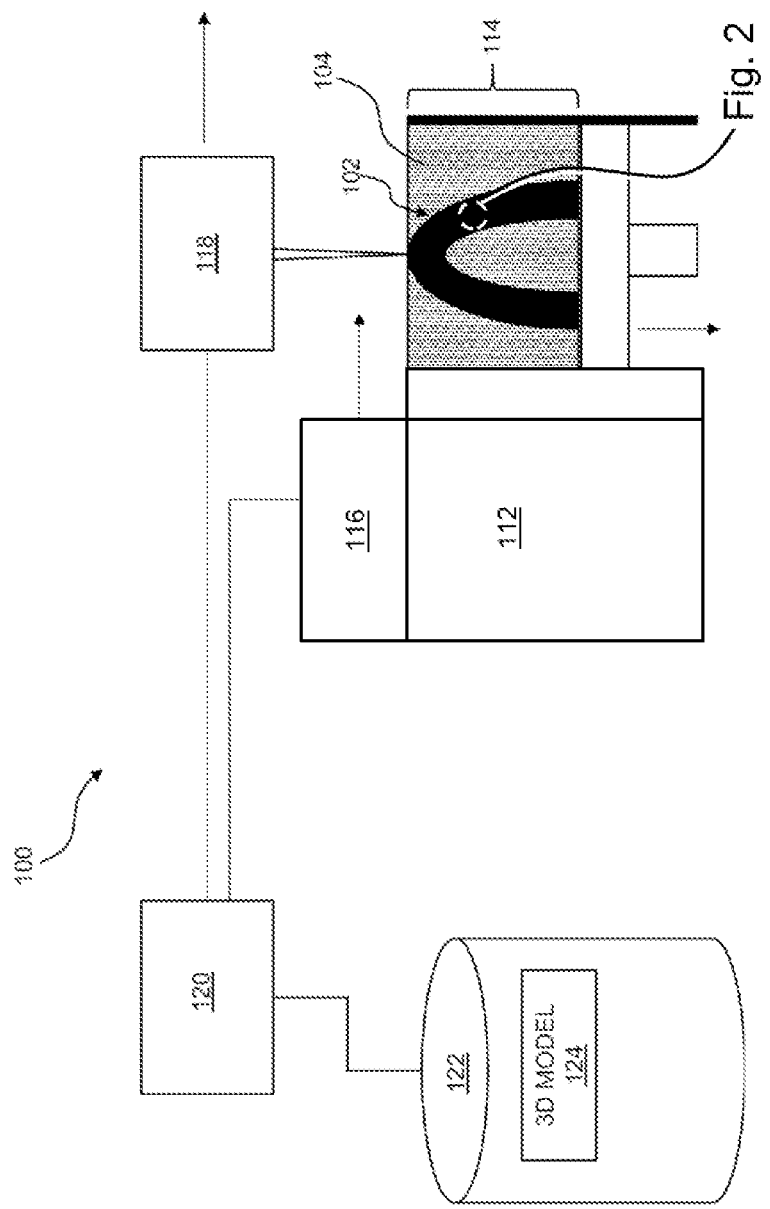
FIGS. 3A and 3B are schematic representations of additive manufacturing systems, according to some embodiments.
Figure 3B:
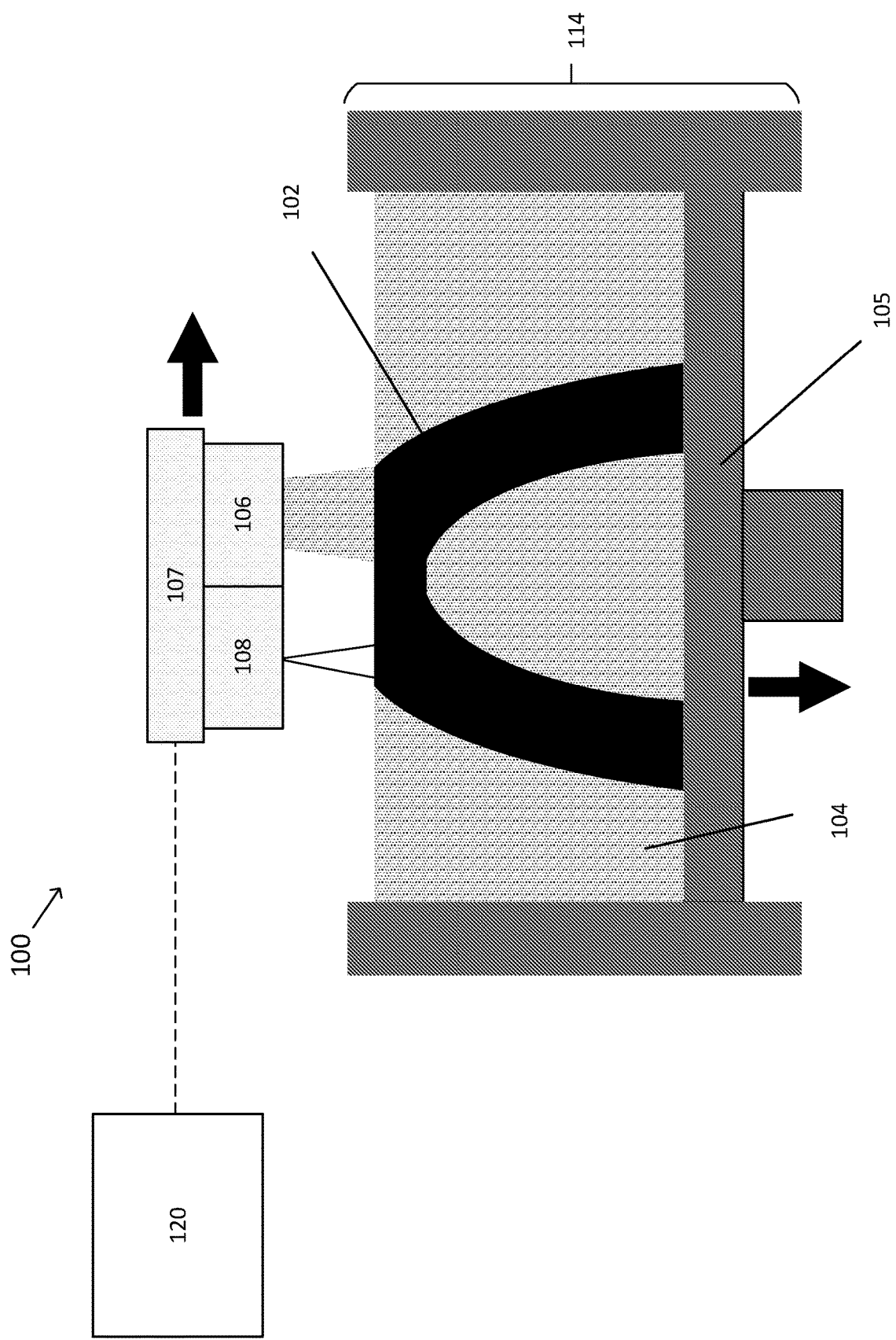

FIG. 1 is a flowchart of an exemplary method 200 of forming a three-dimensional object (e.g., a printed part) with an additive manufacturing process. The method 200 can be implemented using any one or more of the various different additive manufacturing systems described herein. For example, the method 200 can be implemented as computer-readable instructions stored on the storage medium 122 (FIG. 3A) and executable by the controller 120 (FIGS. 3A and 3B) to operate the additive manufacturing system 100 (FIGS. 3A and 3B).

As shown in step 202, the method 200 includes adding a polymer to a liquid to form a binder formulation. Depending on the particular embodiment, the polymer may be added to the liquid using conventional blending techniques such as stirring, shaking, rocking, sonication, and so on. Moreover, in some embodiments, the polymer may be added to the liquid in multiple blending steps. Accordingly, it should be understood that the current disclosure is not limited to any particular technique or combinations of techniques for adding the polymer to the liquid, or for dissolving the polymer in the liquid.

As shown at step 204, the method 200 includes providing a layer of powder (e.g., by spreading a layer of the powder across a powder bed surface).

Forming a three-dimensional object comprising a composition described herein—e.g., comprising a binder formulation (e.g., comprising a polymer, e.g., comprising a nitrogen-containing repeat unit) and a powder (e.g., metal powder, e.g., comprising a noble metal)—in a powder bed may involve providing a layer of powder. Providing a layer of powder generally involves spreading a powder (e.g., a plurality of particles) onto a horizontal surface (e.g., a solid surface/substrate, a surface of another powder layer) to form a layer. The resultant layer may comprise the powder. Spreading a layer of powder can be accomplished by any conventional spreading technique using a spreading tool, e.g., rollers, a doctor blade, and/or a sifter.

A layer of powder (e.g., provided by a spreading method described herein) has a thickness suitable for an additive manufacturing method, and has a thickness of greater than or equal to the particle size (e.g., D50) of the powder. In some embodiments, the powder layer has a thickness of at least 1 micron, at least 10 microns, or at least 25 microns. In some embodiments, the powder layer has a thickness of at most 200 microns, at most 150 microns, or at most 100 microns. Combinations of the above-referenced ranges are also possible (e.g., between or equal to 1 micron and 200 microns, between or equal to 10 microns and 100 microns, between or equal to 25 microns and 100 microns). Other ranges are also possible.

The powder may include any suitable combination of powders as described herein. Moreover, it should be understood that spreading the layer of powder may involve using any suitable deposition process to deposit a layer of the powder across the powder bed, and that the layer of powder may have any suitable geometry. In particular, it should be understood that the word "layer" as used herein does not necessarily refer a homogeneous, planar layer, but may be refer to any structure exhibiting a generally layer-like geometry. For example, a layer may not be planar, but may have a tortuous geometry in three dimensional space while maintaining a substantially two-dimensional character in many locations locally. In some instances, a layer may be discontinuous or may exhibit a perforated structure. A layer may generally have a two-dimensional geometry, but may exhibit a characteristic along a third dimension, such as a thickness. The thickness of a particular layer may be constant or variable within the layer, and in some locations, the thickness of the layer may be zero. It should be understood that the deviations of a layer from absolute planarity and constant thickness may occur due to process non-idealities (e.g. a lack of planarity of a spreading device with respect to a prior flat layer of powder, notches or abrasions in the spreading devices, and/or unintended or otherwise incidental machine vibrations). Alternatively or additionally, deviations in a layer may occur as intentional aspects of the fabrication process (e.g. a non-constant layer height to increase build rate in certain regions, a tilted spreading device to facilitate powder flow, etc.). It should further be understood that the characteristics of a layer, such as the thickness and/or geometry of a layer, may vary from one layer to a next, as well as within a layer. Moreover, a layer may comprise a mixture of several materials at microscopic and/or macroscopic length scales. Accordingly, it should be understood that the current disclosure is not limited to any particular layer structure formed by spreading the powder across the powder bed surface.

As shown at step 206, the method 200 further includes depositing the binder formulation onto at least a portion of the layer to selectively join the powder within the layer along a predetermined two-dimensional pattern. The resultant layer comprising the powder and the binder formulation may be referred to as a composite layer, and composite layers forming a slice of a three-dimensional structure comprising composite layers disposed on each other may be referred to as image layers. In a binder jetting process, selectively joining the powder may involve jetting the binder formulation to the layer of powder along a controlled two-dimensional pattern associated with the layer. The binder formulation can be jetted from a print head, and the binder formulation may comprise one or more components of a binder formulation described herein.

Composite layers formed by the deposition of a binder composition onto a powder layer may have a variety of suitable thicknesses. In some embodiments, a composite layer has a thickness of at least 10 microns, at least 15 microns, at least 20 microns, at least 30 microns, at least 50 microns, at least 75 microns, at least 100 microns, at least 125 microns, at least 150 microns, or at least 175 microns. In some embodiments, a composite layer has a thickness of at most 200 microns, at most 175 microns, at most 150 microns, at most 125 microns, at most 100 microns, at most 75 microns, at most 50 microns, at most 30 microns, at most 20 microns, or at most 15 microns. Combinations of the above-referenced ranges are also possible (e.g., between or equal to 10 microns and 200 microns, between or equal to 25 microns and 100 microns). Other ranges are also possible.

Forming a three-dimensional object may involve depositing droplets of binder formulation onto a selected area of a layer of powder to form a two-dimensional object (e.g., a continuous two-dimensional object). As used herein, a "two-dimensional object" (e.g., a continuous two-dimensional object) may be an object that is one layer thick and comprises a binder formulation and a powder. Two dimensional objects may be built up upon each other to form a three-dimensional structure. The resultant three-dimensional structure may comprise the plurality of two-dimensional objects disposed on each other. Depositing droplets of binder formulation onto a selected area of a layer of powder, to form a two-dimensional object, may involve flowing the binder formulation through a print head (e.g., an inkjet print head) to form droplets. The print head, and/or a component thereof, may be used to form the droplets. Any suitable inkjet print head may be used, having a size and characteristics appropriate to the application. For instance, in some embodiments piezoelectric print heads are used and in some embodiments thermal print heads are used. Non-limiting examples of suitable commercially available print heads include a SAMBA or an SG1024 print head available from FujiFilm, or a XAAR 5601 print head available from XAAR.

In some embodiments, a binder formulation of the current disclosure has properties (e.g., viscosity, surface tension as discussed herein) such that, when used with a print head (e.g., standard inkjet print head), the binder formulation forms droplets having characteristics (e.g., droplet volume, droplet velocity) that are suitable for creating two-dimensional objects in powder (e.g., a layer of powder, a layer of metal powder).

One characteristic of binder formulation droplets is droplet volume. The droplet volume of droplets (e.g., droplets formed from a print head) should generally be large enough to be able to adequately control the trajectory of a droplet as it descends to the powder so as to create a two-dimensional object with high resolution or positional accuracy. In some embodiments, the droplet volume is at least 0.5 picoLiters (pL), at least 1 pL, at least 2 pL, at least 4 pL, or at least 6 pL. In some embodiments, the droplet volume is at most 100 pL, at most 50 pL, at most 20 pL, at most 10 pL, at most 5 pL, or at most 2 pL. Combinations of the above-referenced ranges are also possible (e.g., between or equal to 0.5 pL and 20 pL, between or equal to 2 pL and 20 pL, between or equal to 0.5 pL and 2 pL, between or equal to 2 pL and 100 pL, between or equal to 4 pL and 50 pL, between or equal to 6 pL and 20 pL). Other ranges are also possible. By contrast, satellite droplets generally may decrease the print resolution and the material use efficiency of the printing process. Droplet volume may be measured using a high speed camera, or a stroboscope/camera apparatus, with imaging software.

In some embodiments, a plurality of droplets comprises almost exclusively main droplets and very few satellite droplets. In other words, a binder formulation may form droplets in a manner that does not substantially form satellite droplets. The satellite droplets may be droplets having a smaller volume than the main droplets. In some embodiments, satellite droplets have a volume of less than 1.5 pL, less than 1 pL, or less than 0.5 pL. For instance, in some embodiments, less than 1% of the droplets within a plurality of droplets are satellite droplets (e.g., less than 1% of the droplets have a volume of less than 1.5 pL, less than 1 pL, or less than 0.5 pL when the main droplets have a volume of greater than 0.5 pL, 1 pL, or 1.5 pL). In some embodiments, a plurality of droplets comprises exclusively main droplets and no satellite droplets and/or a binder formulation forms droplets in a manner that does not form satellite droplets. The presence of satellite droplets, and their amount, may be determined by using the technique described for measuring droplet volume described above.

Another characteristic of binder formulations (e.g., binder formulation droplets, such as binder formulation droplets departing from an inkjet print head) is velocity (e.g., droplet velocity) at which the binder formulation is deposited. The velocity (e.g., droplet velocity of droplets formed from a print head) should generally be high enough to be able to adequately control the trajectory of the binder formulation (e.g., a droplet thereof) as it descends to the powder so as to create a two-dimensional object with high resolution or positional accuracy. In some embodiments, the velocity (e.g., droplet velocity) is at least 4 m/s, at least 6 m/s, or at least 7 m/s, measured at 0.5 mm from an outlet of a print head nozzle. In some embodiments, the velocity (e.g., droplet velocity) is at most 20 m/s, at most 15 m/s, at most 13 m/s, or at most 12 m/s, measured at 0.5 mm from a print head nozzle. Combinations of the above-referenced ranges are also possible (e.g., between or equal to 4 m/s and 20 m/s, between or equal to 4 m/s and 12 m/s, between or equal to 6 m/s and 15 m/s, or between or equal to 7 m/s and 13 m/s). Other ranges are also possible. By contrast, satellite droplets having a velocity of less than 4 m/s generally may decrease the print resolution and the material use efficiency of the printing process. Binder formulation velocity, such as droplet velocity of droplets comprising a binder formulation, may be measured using a high speed camera, or a stroboscope/camera apparatus, with imaging software.

In some embodiments, a binder formulation has a relatively low latency. The latency of the binder formulation may be determined by performing the following sequence of steps: (1) Employing a print head to form droplets of the binder formulation in a continuous manner; (2) Stopping formation of droplets of the binder formulation for 5 seconds; (3) Employing the print head to produce pulses until formation of droplets of the binder formulation resumes; and (4) Identifying the latency as the number of pulses produced in step (3) prior to resumption of the formation of droplets of the binder formulation. In some embodiments, a binder formulation has a latency of at most 300 pulses, at most 275 pulses, at most 250 pulses, at most 225 pulses, at most 200 pulses, at most 175 pulses, at most 150 pulses, at most 125 pulses, at most 100 pulses, at most 75 pulses, at most 50 pulses, at most 40 pulses, at most 30 pulses, or at most 20 pulses. In some embodiments, a binder formulation has a latency of at least 10 pulses, at least 20 pulses, at least 30 pulses, at least 40 pulses, at least 50 pulses, at least 75 pulses, at least 100 pulses, at least 125 pulses, at least 150 pulses, at least 175 pulses, at least 200 pulses, at least 225 pulses, at least 250 pulses, or at least 275 pulses. Combinations of the above-referenced ranges are also possible (e.g., between or equal to 10 pulses and 300 pulses). Other ranges are also possible. It should be understood that the latencies referred to above may refer to the latencies of any of the binder formulations described herein as determined in combination with any of the print heads described herein.

Forming a three-dimensional object may involve depositing (e.g., spreading) a layer of powder directly on top of a layer comprising a composition described herein (e.g., directly on top of a composite layer). The powder deposited directly on top of a composite layer may be incorporated into the composite layer or may serve as a powder layer onto which a further amount of binder formulation may be deposited to form a second composite layer disposed on the first composite layer.

As shown at step 208, the method includes repeating the steps of spreading a layer of the powder across the powder bed and selectively joining the powder along a predetermined two-dimensional pattern for each layer of a plurality of sequential layers to form a three-dimensional object (i.e., a printed part or a manufactured part) in the powder bed. It should be appreciated that the predetermined two-dimensional pattern in each layer can vary from layer to layer in the plurality of sequential layers, particularly in instances in which the three-dimensional object being formed from the predetermined two-dimensional patterns has a complex shape. Moreover, it should be understood that depending on the particular additive manufacturing process, joining a portion of the powder within a particular layer may also join at least a portion of the layer to at least one previously joined layer, such as a layer formed immediately prior to the particular layer.

Forming a three-dimensional object may involve alternating, for a plurality of cycles the steps of (1) depositing droplets of binder formulation onto a selected area of a currently exposed layer of powder to form a two-dimensional object (e.g., continuous two-dimensional object) and (2) spreading a next layer of powder directly on top of the currently exposed layer (which currently exposed layer comprises a composition described herein), until the desired three-dimensional object has been completed. During formation of a three-dimensional object, when a plurality of layers have been formed, binder formulation droplets from a given layer generally diffuse slightly into any directly adjacent layer such that the two-dimensional objects are interconnected to form a three-dimensional object (e.g., continuous three-dimensional object).

After a three-dimensional object is formed, one or more post-processing steps (e.g., de-binding processes, and/or sintering processes) may be performed to form a final part as shown at step 210.

As noted above, although powder processes (e.g., powder metallurgical processes) involving jetting a binder formulation onto a powder bed are described above, it should be understood that the current disclosure is not limited to any particular type powder process involving a binder. For example, the binder formulations described herein may be suitable for any of a variety of powder-based processes, including, but not limited to, binder jetting processes, injection molding processes, or any other suitable powder processes to form a three-dimensional object.

Figure 2:
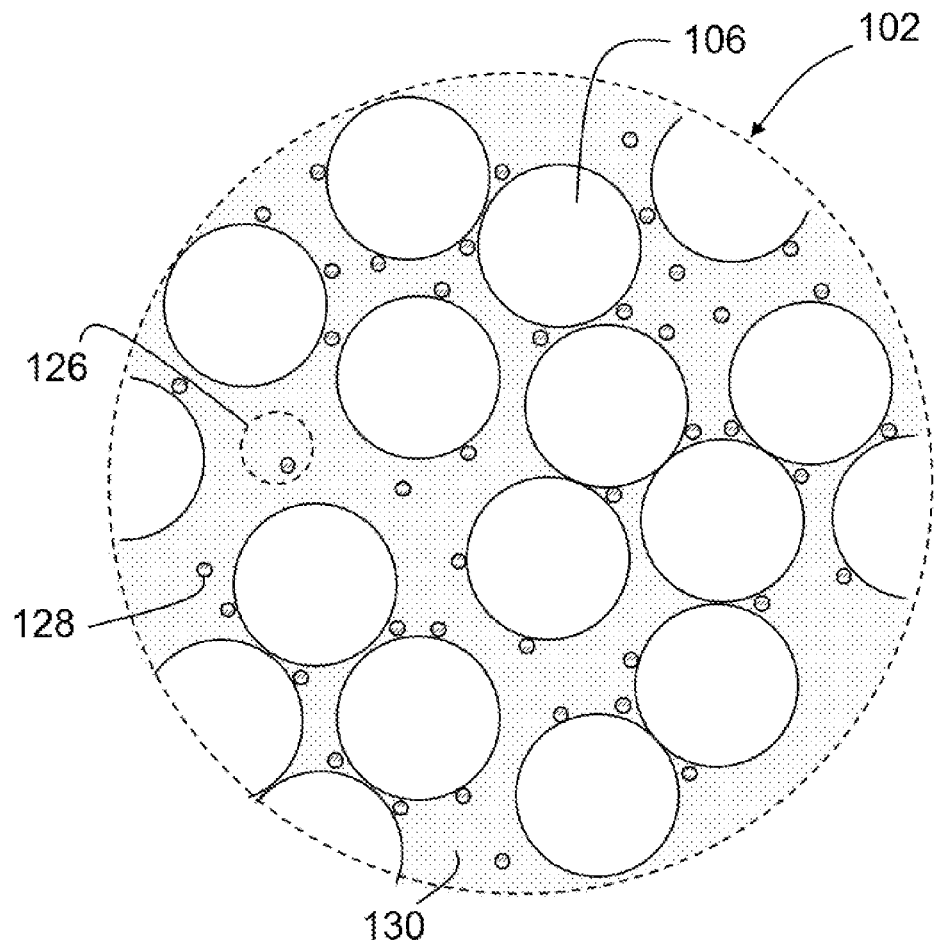
FIG. 2 is a schematic representation of a cross-sectional portion of a three-dimensional object, according to some embodiments.

Referring now to FIG. 2, the three-dimensional object 102 is described in more detail. In some embodiments, the three-dimensional object 102 comprises a composition comprising a binder formulation 126 and a powder comprising powder particles 106. In some embodiments, a powder may further comprise at least one component (e.g., binder, e.g., polymer) of the binder formulation.

As illustrated, the binder formulation 126 may comprise a liquid 130 and a polymer 128, and the polymer molecules 128 are generally smaller than the powder particles 106. The polymer molecules 128 may be interspersed with and interact with the powder particles 106, e.g., by electron-donating interactions between nitrogen-containing polymer units of the polymer molecules 128 and metal in the powder particles 106. In this manner, the polymer molecules 128 may increase the inter-particle cohesion between the powder particles 106 relative to the inter-particle cohesion between the powder particles 106 if the binder formulation 126 were absent polymers having nitrogen-containing polymer units.

While the powder particles 106 and polymer molecules 128 are generally depicted as spherical, it should be understood that the particles and molecules may have any suitable shape and/or morphology. For example, in some embodiments, the particles may exhibit morphologies ranging from smooth, spherical particles to particles exhibiting a high fractal dimension structure, such as fumed particles or precipitated particles. The polymers may have an extended chain morphology or a spherical morphology, and may have a linear chain or a branched chain or dendritic structure. In some instances, a powder may comprise various combinations of particles with different shapes and/or morphologies. Moreover, while each of the powder particles and polymer molecules are depicted as having a generally uniform size distribution, it should be understood that various non-uniform distributions for the particle sizes and polymer molecule sizes may be suitable. Accordingly, it should be understood that the current disclosure is not limited to any particular combinations of shapes, morphologies, and/or size distributions of particles and/or polymer molecules.

As discussed above, the binder formulation 126 may have a concentration of polymer molecules 128, and the three-dimensional object 102 may have a weight percentage of binder formulation 126, such that once the binder formulation 126 has been added to the powder particles 106 to form three-dimensional object 102, the polymer molecules 128 are present in three-dimensional object 102 in an amount suitable to achieve a desired strength of a solid self-supporting composite comprising the polymer molecules and the powder particles, wherein the self-supporting composite may be formed by heating the three-dimensional object 102. For example, the binder formulation 126 may have a concentration of between or equal to 5 wt % and 50 wt %, between or equal to 10 wt % and 40 wt %, and/or between or equal to 15 wt % and 30 wt % of polymer molecules 128, relative to the weight of the binder formulation 126. The three-dimensional object 102 may comprise between or equal to 0.4 wt % and 60 wt %, between or equal to 1 wt % and 30 wt %, and/or between or equal to 2 wt % and 6 wt % of the binder formulation 126, relative to the weight of the three-dimensional object 102. Additionally, in some embodiments in which the powder comprises at least one component of a binder system, the binder component may comprise between about 1 percent and about 20 percent by weight of the powder.

Depending on the particular embodiment, the powder particles 106 may comprise any suitable metallic and/or ceramic components. For example, the powder 106 can be a single fine elemental powder, such as a powder of copper, gold, silver, platinum, or another metal. As another example, the powder 106 can be an alloy powder (e.g., a single alloy powder). As used herein, a single material shall be understood to allow for impurities at levels associated with powder handling of metals and, further or instead, to allow for impurities in predetermined amounts of impurities specified for the three-dimensional object 102. Moreover, in some embodiments, the powder 106 may comprise a plurality of materials. For example, a ratio of the plurality of materials in the powder 106 can be set to a predetermined ratio suitable for alloying with one another to achieve a target alloy composition in the three-dimensional object 102 upon sintering. As an additional or alternative example, the powder 106 can include material components of stainless steel. As another specific example, the powder 106 can include two or more of copper, gold, silver, or platinum.

In some embodiments, at least one component of the binder formulation that is present in the powder can include an organic binder such as, for example, an organic binder that is soluble in water or other liquid jetted from the print head 118. Additionally, or alternatively, at least one component of the binder formulation can include one or more polymers described herein.

In some embodiments, post-processing of a three-dimensional object includes heating the three-dimensional object. Heating a three-dimensional object may involve heating a powder bed with the three-dimensional object within the powder bed (e.g., resulting from an additive manufacturing method described herein). A method may involve heating a three-dimensional object to a sufficient temperature and for a sufficient amount of time to convert the three-dimensional object into a self-supporting binder-powder composite, also referred to herein as a "brown" part. As described above, this heating step may be referred to as a curing step. The heating may be conducted in air, in an inert atmosphere (e.g., comprising nitrogen, comprising argon), or in a reducing atmosphere (e.g., comprising hydrogen). The pressure during heating may be between or equal to 0 atmospheres (atm) and 1 atm. A composite or "brown" part may be considered "self-supporting" for normal process manipulations when its minimum mechanical strength is 5 MPa. The minimum mechanical strength may be measured as a transverse rupture strength (TRS) according to ASTM B528-16.

A self-supporting composite has a sufficient transverse rupture strength such that the composite can be readily handled and/or transported. In some embodiments, the composite has a transverse rupture strength of at least 2 MPa, at least 5 MPa, at least 10 MPa, at least 15 MPa, at least 20 MPa, at least 25 MPa, at least 30 MPa, at least 40 MPa, at least 50 MPa, at least 75 MPa, at least 100 MPa, or more. In some embodiments, the composite has a transverse rupture strength of at most 100 MPa, at most 75 MPa, at most 50 MPa, at most 40 MPa, at most 30 MPa, at most 25 MPa, or at most 20 MPa. Combinations of the above-referenced ranges are also possible (e.g., between or equal to 2 MPa and 100 MPa, between or equal to 5 MPa and 100 MPa, between or equal to 5 MPa and 30 MPa, between or equal to 10 MPa and 25 MPa, between or equal to 15 MPa and 20 MPa). Other ranges are also possible. In certain embodiments, it may be preferred that the composite has a transverse rupture strength of at least 10 MPa and at most 30 MPa. In other embodiments, the composite may have a transverse rupture strength that is higher than 30 MPa.

Generally, a first heating temperature (e.g., a temperature of an environment in which a three-dimensional object and/or a composite layer therein is positioned during a curing step) is sufficient to form a self-supporting structure but not so high as to remove all of the binder from the composite. A "first heating temperature," as used herein, may be the temperature of an environment to which a three-dimensional object is exposed during heating to form a composite. In some embodiments, a first heating temperature is at least 90° C., at least 100° C., or at least 120° C. In some embodiments, a first heating temperature is at most 250° C., at most 230° C., at most 220° C., or at most 180° C. Combinations of the above-referenced ranges are also possible (e.g., between or equal to 90° C. and 250° C., between or equal to 100° C. and 230° C., between or equal to 120° C. and 180° C., between or equal to 120° C. and 220° C.). Other ranges are also possible. In certain embodiments, it may be preferred that the first heating temperature is between or equal to 120° C. and 180° C.

Generally, a first heating duration is sufficient to form a self-supporting structure. A "first heating duration," as used herein, may be the duration for which a three-dimensional object is exposed to a first heating temperature during heating to form a composite. In some embodiments, a first heating duration is at least 15 minutes, at least 30 minutes, at least 45 minutes, at least 1 hour, at least 90 minutes, at least 2 hours, at least 3 hours, at least 4 hours, at least 5 hours, at least 6 hours, at least 8 hours, at least 10 hours, at least 12 hours, at least 14 hours, at least 16 hours, at least 18 hours, at least 20 hours, at least 1 day, at least 2 days, at least 3 days, at least 4 days, at least 100 hours, at least 5 days, or at least 6 days. In some embodiments, a first heating duration is at most 1 week, at most 6 days, at most 5 days, at most 100 hours, at most 4 days, at most 3 days, at most 2 days, at most 1 day, at most 20 hours, at most 18 hours, at most 16 hours, at most 14 hours, at most 12 hours, at most 10 hours, at most 8 hours, at most 6 hours, at most 5 hours, at most 4 hours, at most 3 hours, at most 140 minutes, at most 120 minutes, or at most 100 minutes. Combinations of the above-referenced ranges are also possible (e.g., between or equal to 15 minutes and 1 week, between or equal to 15 minutes and 140 minutes, between or equal to 15 minutes and 120 minutes, between or equal to 45 minutes and 120 minutes, between or equal to 30 minutes and 100 minutes, between or equal to 1 hour and 20 hours). Other ranges are also possible. In certain embodiments, it may be preferred that the first heating duration is between or equal to 45 minutes in 120 minutes. In other embodiments, longer first heating durations are preferred (e.g., between or equal to 8 hours and 12 hours).

In some embodiments, curing is performed in a manner that minimizes the tendency of the three-dimensional object to form cracks. For instance, curing may be performed in a manner such that changes between temperatures are performed relatively slowly. In some embodiments, curing is performed such that the change in temperature of the environment in which the three-dimensional object is positioned is at most 2° C./min, at most 1.5° C./min, at most 1° C./min, at most 0.75° C./min, at most 0.5° C./min, or at most 0.25° C./min. In some embodiments, curing is performed such that that the change in temperature of the environment in which the three-dimensional object is positioned is at least 0.1° C./min, at least 0.25° C./min, at least 0.5° C./min, at least 0.75° C./min, at least 1° C./min, or at least 1.5° C./min. Combinations of the above-referenced ranges are also possible (e.g., between or equal to 2° C./min and 0.1° C./min). Other ranges are also possible. In some embodiments, the temperature of the environment in which the three-dimensional object is positioned is either constant or changes at a rate in one or more of the ranges described above throughout a curing process. In some embodiments, a curing process comprises a change in temperature at a rate in one or more of the ranges described above but also comprises further changes in temperature (e.g., at a rate in one or more of the ranges described above, at a rate outside of the ranges described above).

Heating a "brown" part (also referred to herein as a "composite") may involve heating the part to a sufficient temperature and for a sufficient amount of time to remove the binder and to produce a pre-sintered part. A method step of heating the "brown" part is also referred to herein as a "de-binding" step. When a de-binding step is performed on a "brown part", at least a portion of the binder formulation may be removed from one or more of the cured composite layers therein. In some embodiments, all or substantially all of the binder formulation is removed from one or more of the cured composite layers therein. Typically, "de-binding" steps result in the removal of at least a large fraction of the binder formulation in a "brown" part. In some embodiments, a "de-binding" step or steps does not remove all of the binder formulation in the "brown" part. The portion(s) of the binder formulation not removed during the "de-binding" step or steps may be solid material(s), such as solid thermal decomposition product(s) of one or more components of the binder formulation. In some embodiments, performing a "de-binding" step or steps results in the formation of char from at least a portion of the binder composition.

Generally, a second heating temperature during de-binding is sufficient to remove the binder from the composite to form a pre-sintered part, but not so high as to sinter the particles of the powder in the composite to an appreciable extent. A "second heating temperature," as used herein, may be the temperature of an environment to which a composite is exposed during heating to form a pre-sintered part. A second heating temperature is generally greater than a first heating temperature and/or lower than a third heating temperature. During de-binding, binder is removed by oxidative degradation (e.g., for embodiments where de-binding is carried out in air) and/or thermal degradation.

De-binding may be carried out in air, in an inert atmosphere (e.g., comprising nitrogen, argon), or in a reducing atmosphere (e.g., an atmosphere comprising hydrogen, an atmosphere comprising carbon monoxide). One example of a suitable atmosphere in which de-binding may be carried out is an atmosphere comprising a forming gas. The forming gas may comprise both an inert gas (e.g., argon) and a reducing gas (e.g., hydrogen). The reducing gas may make up at least 3%, at least 4%, at least 5%, at least 6%, at least 7%, at least 8%, or at least 9% of the forming gas. In some embodiments, the reducing gas makes up at most 10%, at most 9%, at most 8%, at most 7%, at most 6%, at most 5%, or at most 4% of the forming gas. Combinations of the above-referenced ranges are also possible (e.g., between or equal to 3% and 100%). Other ranges are also possible.

In some embodiments, a second heating temperature is at least 220° C., at least 300° C., at least 400° C., at least 500° C., at least 550° C., at least 600° C., at least 700° C., at least 800° C., at least 900° C., at least 1000° C., or at least 1100° C. In some embodiments, a second heating temperature is at most 1200° C., at most 1100° C., at most 1000° C., at most 900° C., at most 800° C., 700° C., at most 600° C., at most 550° C., at most 500° C., at most 400° C., or at most 300° C. Combinations of the above-referenced ranges are also possible (e.g., between or equal to 220° C. and 1200° C., between or equal to 220° C. and 700° C., between or equal to 220° C. and 300° C., between or equal to 300° C. and 700° C., between or equal to 400° C. and 600° C., or between or equal to 500° C. and 550° C.). Other ranges are also possible.

It should be understood that some de-binding steps may comprise heating a composite to two or more temperatures in sequence. For instance, a de-binding step may comprise heating a composite to one second heating temperature at which one portion of the binder is expected to degrade (e.g., based on a thermogravimetric analysis performed on the binder) and then heating the composite to another second heating temperature at which another portion of the binder is expected to degrade (e.g., based on a thermogravimetric analysis performed on the binder). These temperatures may be successively increasing (e.g., each temperature to which the composite is heated during the de-binding step may be higher than the previous temperature to which the composite was heated during the de-binding step). Some such de-binding steps may comprise heating the composite to three, four, five, or even more second heating temperatures in sequence. Some or all of the second heating temperatures may be within one or more of the above-described ranges.

In some embodiments, a second heating temperature is at least 50° C. lower than a third heating temperature as described below.

Generally, a second heating duration is sufficient to form a pre-sintered part. A "second heating duration," as used herein, may be the duration for which a composite is exposed to a second heating temperature during de-binding to form a pre-sintered part. In some embodiments, a second heating duration is at least 15 minutes, at least 30 minutes, at least 45 minutes, at least 60 minutes, at least 100 minutes, at least 120 minutes, at least 140 minutes, at least 2 hours, at least 3 hours, at least 4 hours, at least 5 hours, at least 6 hours, at least 7 hours, at least 8 hours, at least 9 hours, at least 10 hours, at least 12 hours, at least 14 hours, at least 18 hours, at least 1 day, at least 2 days, at least 3 days, at least 4 days, at least 5 days, or at least 6 days. In some embodiments, a second heating duration is at most 1 week, at most 6 days, at most 5 days, at most 4 days, at most 3 days, at most 2 days, at most 1 day, at most 18 hours, at most 14 hours, at most 12 hours, at most 10 hours, at most 9 hours, at most 8 hours, at most 7 hours, at most 6 hours, at most 5 hours, at most 4 hours, at most 3 hours, at most 2 hours, at most 140 minutes, at most 120 minutes, or at most 100 minutes. Combinations of the above-referenced ranges are also possible (e.g., between or equal to 15 minutes and 1 week, between or equal to 15 minutes and 140 minutes, between or equal to 45 minutes and 120 minutes, between or equal to 30 minutes and 100 minutes, between or equal to 3 hours and 6 hours, between or equal to 4 hours and 10 hours). Other ranges are also possible.

When a de-binding step comprises heating a composite to two or more temperatures in sequence, it should be understood that the time that the composite is held at any of the second heating temperatures may be within one or more of the above-referenced ranges and/or that the total time over which the de-binding step is performed may be within one or more of the above-referenced ranges.

In some embodiments, a de-binding step is performed in a manner that minimizes the tendency of the composite to form cracks. For instance, the de-binding step may be performed in a manner such that changes between temperatures are accomplished relatively slowly. In some embodiments, a de-binding step is performed such that the change in temperature of the environment in which the composite is positioned is at most 2° C./min, at most 1.5° C./min, at most 1° C./min, at most 0.75° C./min, at most 0.5° C./min, or at most 0.25° C./min. In some embodiments, a de-binding step is performed such that that the change in temperature of the environment in which the composite is positioned is at least 0.1° C./min, at least 0.25° C./min, at least 0.5° C./min, at least 0.75° C./min, at least 1° C./min, or at least 1.5° C./min. Combinations of the above-referenced ranges are also possible (e.g., between or equal to 2° C./min and 0.1° C./min). Other ranges are also possible. In some embodiments, the temperature of the environment in which the composite is positioned is either constant or changes at a rate in one or more of the ranges described above throughout the de-binding step. In some embodiments, the de-binding step comprises a change in temperature at a rate in one or more of the ranges described above but also comprises further changes in temperature (e.g., at a rate in one or more of the ranges described above, at a rate outside of the ranges described above).

In some embodiments, during the de-binding step, the pressure of the environment to which the composite or pre-sintered part is exposed is set to a full vacuum or a partial vacuum to remove decomposition products from the composite or pre-sintered part. In some embodiments, the partial vacuum environment pressure is between or equal to $10^{-3}$ bar and 70 bar. For instance, the partial vacuum environment pressure may be between $10^{-3}$ bar and 1 bar or between $10^{-3}$ bar and $10^{-1}$ bar. In some embodiments, the full vacuum environment pressure is between or equal to $10^{-11}$ bar and $10^{-3}$ bar. In some embodiments, the pressure of the environment to which the composite or pre-sintered part is exposed is cycled between atmospheric pressure and partial vacuum.

In some embodiments, during the de-binding step, the "brown" part and/or cured composite layer may be exposed to an environment other than a vacuum. For instance, the cured composite layer may be exposed to oxidative environment (e.g., an environment comprising air), an inert environment (e.g., an environment comprising an inert gas), or a reducing environment (e.g., an environment comprising a reducing gas).

In some embodiments, an environment in which a composite material (e.g., a "brown" part) is positioned during heating comprises a relatively low amount of one or more species (e.g., one or more species reactive with one or more components of the binder). For instance, in some embodiments, an environment in which a composite material is heated comprises at least 2 wt %, at least 4 wt %, at least 6 wt %, or at least 8 wt % hydrogen. The environment in which a composite material is heated may comprise at most 10 wt %, at most 8 wt %, at most 6 wt %, or at most 4 wt % hydrogen. Combinations of the above-referenced ranges are also possible (e.g., between or equal to 2 wt % and 10 wt %). Other ranges are also possible. For instance, in some embodiments, the environment in which the composite material is heated comprises more than 10 wt % hydrogen (e.g., up to 100 wt % hydrogen).

In some embodiments, an environment in which a composite material is heated has an oxygen content of at most 10 ppm, at most 8 ppm, at most 6 ppm, at most 4 ppm, at most 2 ppm, or at most 1 ppm. The environment in which a composite material is heated may have an oxygen content of at least 0 ppm, at least 1 ppm, at least 2 ppm, at least 4 ppm, at least 6 ppm, or at least 8 ppm. Combinations of the above-referenced ranges are also possible (e.g., between or equal to 10 ppm and 0 ppm). Other ranges are also possible. In other embodiments, the composite material may be heated in an environment comprising more oxygen (e.g., when heated in air).

The pre-sintered part has a very low carbon content as a result of the de-binding step. In some embodiments, the carbon content in the pre-sintered part is at most 0.5 wt %, at most 0.4 wt %, or at most 0.2 wt % relative to the weight of the pre-sintered part. In some embodiments, the carbon content in the pre-sintered part is at least 0 wt %, at least 0.1 wt %, or at most 0.1 wt %. Combinations of the above-referenced ranges are also possible (e.g., between or equal to 0 wt % and 0.5 wt %, between or equal to 0 wt % and 0.2 wt %, between or equal to 0.1 wt % and 0.4 wt %). Other ranges are also possible. In certain embodiments, it may be preferred that the carbon content in the pre-sintered part is below 0.2 wt % (e.g., between or equal to 0 wt % and 0.2 wt %).

Heating a pre-sintered part may involve heating the part to a sufficient temperature and for a sufficient amount of time to sinter particles of the powder together to produce a final part. A method step of heating the pre-sintered part is also referred to herein as a "sintering" step.

Generally, a third heating temperature during sintering is sufficient to sinter particles of the powder together to produce a final part, but not so high as to liquefy the particles of the powder in the composite to an undesirable extent. In some embodiments, the particles of the powder are not liquefied to an appreciable extent during sintering.

A "third heating temperature," as used herein, may be the temperature of an environment to which a pre-sintered part is exposed during sintering to form a final part. A third heating temperature is generally greater than a second heating temperature. Sintering can be carried out in an environment of inert gas (e.g., comprising nitrogen or argon) or reducing gases, or under full vacuum. A non-limiting example of reducing gases includes a mixture of 96 volume percent of argon and 4 volume percent of hydrogen. In some embodiments, a third heating temperature is at least 500° C., at least 700° C., at least 750° C., or at least 900° C. In some embodiments, a second heating temperature is at most 1700° C., at most 1600° C., at most 1500° C., at most 1400° C., at most 1200° C., at most 1000° C., or at most 850° C. Combinations of the above-referenced ranges are also possible (e.g., between or equal to 750° C. and 1700° C., between or equal to 750° C. and 1400° C., between or equal to 500° C. and 1500° C., between or equal to 700° C. and 1600° C., or between or equal to 900° C. and 1400° C.). Other ranges are also possible.

In some embodiments, an environment in which a de-bound material is heated during a sintering step has an oxygen content of at most 10 ppm, at most 8 ppm, at most 6 ppm, at most 4 ppm, at most 2 ppm, or at most 1 ppm. The environment in which a de-bound material is heated may have an oxygen content of at least 0 ppm, at least 1 ppm, at least 2 ppm, at least 4 ppm, at least 6 ppm, or at least 8 ppm. Combinations of the above-referenced ranges are also possible (e.g., between or equal to 10 ppm and 0 ppm). Other ranges are also possible. In other embodiments, the composite material may be heated in an environment comprising more oxygen (e.g., when heated in air) . . . .

The final part has a high relative density, relative to the bulk density of the material (e.g., metal) of which the powder consists, as a result of the sintering step. In some embodiments, the relative density of the part is at least 90%, at least 91%, at least 92%, at least 93%, at least 94%, at least 95%, at least 96%, at least 97%, at least 98%, or at least 99%, relative to the bulk density of the powder material (e.g., the metal powder material).

In some embodiments, a method comprises combining a powder (e.g., a metal powder) with a binder formulation disclosed herein. In some embodiments, combining a powder (e.g., a metal powder, e.g., comprising a noble metal) with a binder formulation (e.g., comprising a polymer, e.g., comprising a nitrogen-containing repeat unit) comprises depositing droplets of binder formulation onto a bed of powder (e.g., metal powder). This method of combining powder with binder formulation may be applicable, e.g., in an additive manufacturing process. In some embodiments, depositing droplets of binder formulation onto a bed of powder is a step in an additive manufacturing process. In some embodiments, depositing droplets of binder formulation onto a bed of powder comprises flowing the binder formulation through a print head (e.g., an ink-jet print head) to form droplets. Droplets of binder formulation may be deposited onto a selected area on the surface of a bed of powder (e.g., metal powder).

In some embodiments, the process further comprises spreading a layer of powder (e.g., metal powder) on a horizontal surface. In some embodiments, the horizontal surface is a solid surface (e.g., a substrate). In some embodiments, the horizontal surface is a surface of a layer comprising a composition described herein, which composition comprises a powder and a polymer and/or a binder formulation.

In some embodiments, a method comprises combining a powder (e.g., a metal powder) with a polymer in powder form using conventional powder blending techniques such as mixing the powders in a v-blender, hand stirring the powders, and/or shaking the powders in a jar. The method may further comprise depositing droplets comprising a first liquid and/or other binder formulation components onto a bed of the polymer-powder mixture, e.g., in an additive manufacturing method.

In some embodiments, combining a powder (e.g., a metal powder) with a binder formulation comprises mixing the binder formulation with the powder to form a suspension of metal particles in the binder formulation. Mixing generally involves using conventional liquid-solid blending techniques such as stirring, vortexing, or sonication. In some embodiments, the process further comprises injecting the suspension into a mold, e.g., in an injection molding process.

In the figures, specific non-limiting embodiments are described in further detail. It should be understood that the various systems, components, features, and methods described relative to these embodiments may be used either individually and/or in any desired combination as the disclosure is not limited to only the specific embodiments described herein.

Referring to FIGS. 3A and 3B, which show two similar versions of an additive manufacturing system 100, the additive manufacturing system 100 is used to form a three-dimensional object 102 from a powder 104. As described below in connection with FIG. 2, the three-dimensional object 102 comprises a composition comprising: a binder formulation 126 comprising a liquid 130 and a polymer 128; and a powder 104 comprising powder particles 106. The three-dimensional object 102 may be referred to as a manufactured part (e.g., a "green" part) or a printed object, and as described in greater detail below, the manufactured part can be subsequently processed (e.g., sintered) to form a finished part. It should be understood that the current disclosure is not limited to any particular type of additive manufacturing process or powder process (e.g., powder metallurgical process) involving a binder. For example, as described in more detail below, the system 100 depicted in FIGS. 3A and 3B utilizes a binder jetting process to selectively join a portion of the powder within a layer of a manufactured part. Other suitable processes to form a manufactured part using a powder and a binder include, but are not limited to injection molding processes and powder fusion processes (e.g., selective laser melting processes).

The additive manufacturing system 100 can include a powder deposition mechanism 106 (e.g., shown in FIG. 3B) and a print head (e.g., shown as print head 118 in FIG. 3A and print head 108 in FIG. 3B), which may be coupled to and moved across the print area by a unit 107 (e.g., as shown in FIG. 3B). The powder deposition mechanism 106 may be operated to deposit powder 104 onto the powder bed 114.

In some embodiments, the powder deposition mechanism comprises a powder supply 112, a powder bed 114, and a spreader 116 (e.g., as shown in FIG. 3A). When present, the spreader 116 can be movable from the powder supply 112 to the powder bed 114 and along the powder bed 114 to deposit powder 104 onto the powder bed 114 and to spread successive layers of the powder 104 across the powder bed 114. As discussed in more detail below, the additive manufacturing apparatus 100 and/or the spreader 116 therein may be configured to form layers of powder on the powder bed having any suitable geometry, and a layer of powder does not necessarily refer to a homogeneous, planar layer. Depending on the particular embodiment, the spreader 116 may include, for example, a roller rotatable about an axis perpendicular to an axis of movement of the spreader 116 across the powder bed 114. The roller can be, for example, substantially cylindrical. In use, rotation of the roller about the axis perpendicular to the axis of movement of the spreader 116 can spread the powder 104 from the powder supply 112 to the powder bed 114 and form a layer of the powder 104 along the powder bed 114. It should be appreciated, therefore, that the plurality of sequential layers of the material 104 can be formed in the powder bed 114 through repeated movement of the spreader 116 across the powder bed 114.

The print head 108 (in FIG. 3B) and/or 118 (in FIG. 3A) can be movable (e.g., in coordination with movement of the spreader 116) across the powder bed 114, and the print head 108 and/or 118 can include one or more orifices through which a liquid (e.g., a binder formulation) can be delivered from the print head 118 to each layer of the powder 104 along the powder bed 114. In certain embodiments, the print head 108 and/or 118 can include one or more piezoelectric elements, and each piezoelectric element may be associated with a respective orifice and, in use, each piezoelectric element can be selectively actuated such that displacement of the piezoelectric element can expel liquid from the respective orifice. In some embodiments, the print head 108 and/or 118 may be arranged to expel a single liquid formulation from the one or more orifices. In other embodiments, the print head 108 and/or 118 may be arranged to expel a plurality of liquid formulations from the one or more orifices. For example, the print head 108 and/or 118 can expel a plurality of liquids (e.g., a plurality of solvents), a plurality of components of a binder formulation, or both from the one or more orifices. Moreover, in some instances, expelling or otherwise delivering a liquid from the print head may include emitting an aerosolized liquid (i.e., an aerosol spray) from a nozzle of the print head.

In general, the print head 108 in FIG. 3B and/or 118 in FIG. 3A may be controlled to deliver liquid such as a binder formulation to the powder bed 114 in predetermined two-dimensional patterns, with each pattern corresponding to a respective layer of the three-dimensional object 102. In this manner, the delivery of the binder formulation 126 may refer to a printing operation in which the powder 104 in each respective layer of the three-dimensional object is selectively joined along the predetermined two-dimensional layers. After each layer of the object is formed as described above, the platform 105 may be moved down and a new layer of powder deposited, binder formulation again applied to the new powder, etc. until the object has been formed.

In some embodiments, the print head 108 (in FIG. 3B) and/or 118 (in FIG. 3A) can extend axially along substantially an entire dimension of the powder bed 114 in a direction perpendicular to a direction of movement of the print head 108 and/or 118 across the powder bed 114. For example, in such embodiments, the print head 118 can define a plurality of orifices arranged along the axial extent of the print head 108 and/or 118, and liquid can be selectively jetted from these orifices along the axial extent to form a predetermined two-dimensional pattern of liquid along the powder bed 114 as the print head 108 and/or 118 moves across the powder bed 114. In some embodiments, the print head 108 and/or 118 may extend only partially across the powder bed 114, and the print head 108 and/or 118 may be movable in two dimensions relative to a plane defined by the powder bed 114 to deliver a predetermined two-dimensional pattern of a liquid along the powder bed 114.

The additive manufacturing system 100 generally further includes a controller 120 in electrical communication with one or more other system components. For instance, in FIG. 3A, controller 120 is in electrical communication with the powder supply 112, the powder bed 114, the spreader 116, and the print head 118. In FIG. 3B, controller 120 is in electrical communication with unit 107, powder deposition mechanism 106, and print head 108. Also in FIG. 3B, controller 120 is configured to control the motion of unit 107, the material deposition mechanism 106 and the print head 108 as described above. A non-transitory, computer readable storage medium 122 may be in communication with the controller 120 and have stored thereon a three-dimensional model 124 and instructions for carrying out any one or more of the methods described herein. Alternatively, the non-transitory, computer readable storage medium may comprise previously prepared instructions. With reference to FIG. 3B, such instructions, when executed by the controller 120, operate the platform 105, unit 107, material deposition mechanism 106 and print head 108 to fabricate one or more parts. For example, one or more processors of the controller 120 can execute instructions to move the unit 107 forwards and backwards along an x-axis direction across the surface of the powder bed 114. One or more processors of the controller 120 also may control the material deposition mechanism 106 to deposit build material onto the powder bed 114. With reference to FIG. 3A, one or more processors of the controller 120 can execute instructions to control movement of one or more of the powder supply 112 and the powder bed 114 relative to one another as the three-dimensional object 102 is being formed. For example, one or more processors of the controller 120 can execute instructions to move the powder supply 112 in a z-axis direction toward the spreader 116 to direct the powder 104 toward the spreader 116 as each layer of the three-dimensional object 102 is formed and to move the powder bed 114 in a z-axis direction away from the spreader 116 to accept each new layer of the powder 104 along the top of the powder bed 114 as the spreader 116 moves across the powder bed 114. One or more processors of the controller 120 also may control movement of the spreader 116 from the powder supply 112 to the powder bed 114 to move successive layers of the powder 104 across the powder bed 114.

In some embodiments, one or more processors of the controller 120 can control movement of the print head 108 (in FIG. 3B) and/or 118 (in FIG. 3A) to deposit liquid such as a binder formulation onto selected regions of the powder bed 114 to deliver a respective predetermined two-dimensional pattern of the liquid to each new layer of the powder 104 along the top of the powder bed 114. In general, as a plurality of sequential layers of the powder 104 are introduced to the powder bed 114 and the predetermined two-dimensional patterns of the liquid are delivered to each respective layer of the plurality of sequential layers of the powder 104, the three-dimensional object 102 is formed according to the three-dimensional model (e.g., a model stored in a non-transitory, computer readable storage medium coupled to, or otherwise accessible by, the controller 120, such as three-dimensional model 124 stored in the non-transitory, computer readable storage medium 122). In certain embodiments, the controller 120 may retrieve the three-dimensional model (e.g., three-dimensional model 124) in response to user input, and generate machine-ready instructions for execution by the additive manufacturing system 100 to fabricate the three-dimensional object 102.

It will be appreciated that the illustrative additive manufacturing system 100 is provided as one example of a suitable additive manufacturing system and is not intended to be limiting with respect to the techniques described herein for controlling the flow behavior of a powder. For instance, it will be appreciated that the techniques may be applied within an additive manufacturing apparatus that utilizes only a roller as a material deposition mechanism and does not include material deposition mechanism 106. Furthermore, the techniques may be applied to other powder-based additive manufacturing apparatus, including those that form cohesive regions of material via application of directed energy rather than via deposition of a liquid. Such systems may for instance include direct metal laser sintering (DMLS) systems.

According to some embodiments, the techniques described herein for controlling the flow behavior of a powder may be employed to control properties of a powder for a binder jet additive manufacturing system. Such a system may comprise additive manufacturing system 100 in addition to one or more other apparatus for producing a completed part. Such apparatus may include, for example, a furnace for sintering a green part fabricated by the additive manufacturing system 100 (or for sintering such a "green" part subsequent to applying other post-processing steps upon the "green" part).

Techniques described herein may refer to a "powder," although it will be appreciated that the techniques described herein are not necessarily limited to use cases in which the material comprises or consists of a powder. As such, while the discussion above may focus primarily on depositing a binder onto a powder, it will be appreciated that any binder deposition process described herein may also apply to deposition of a binder onto any granular material(s).

Figure 4:
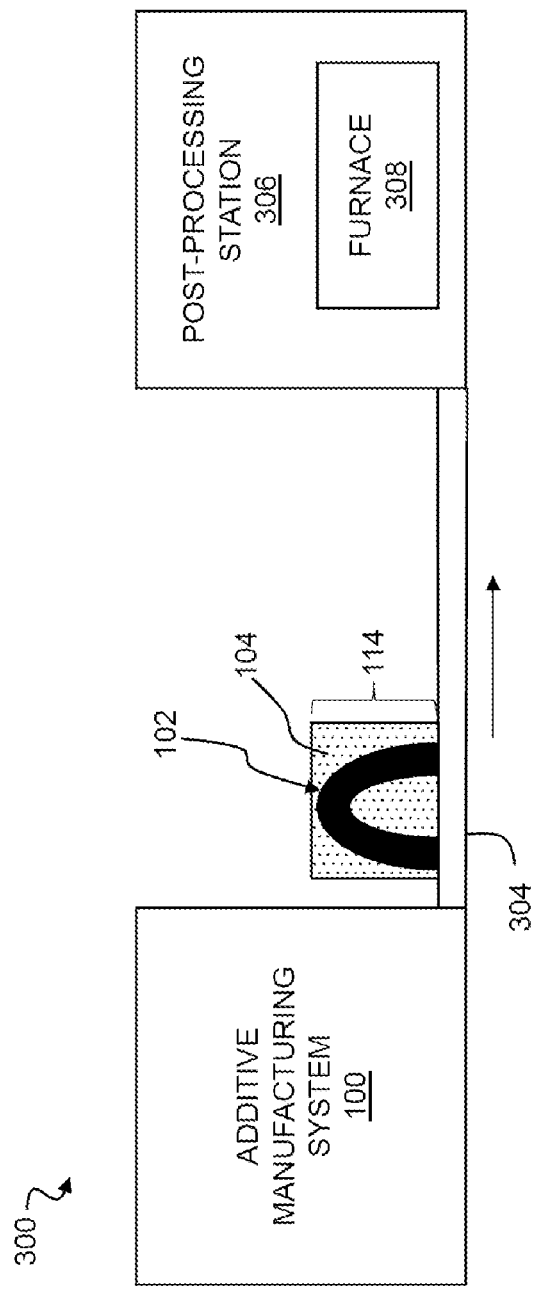
FIG. 4 is a schematic representation of an additive manufacturing plant including an additive manufacturing system and a post processing station, according to some embodiments.
Figure 5:
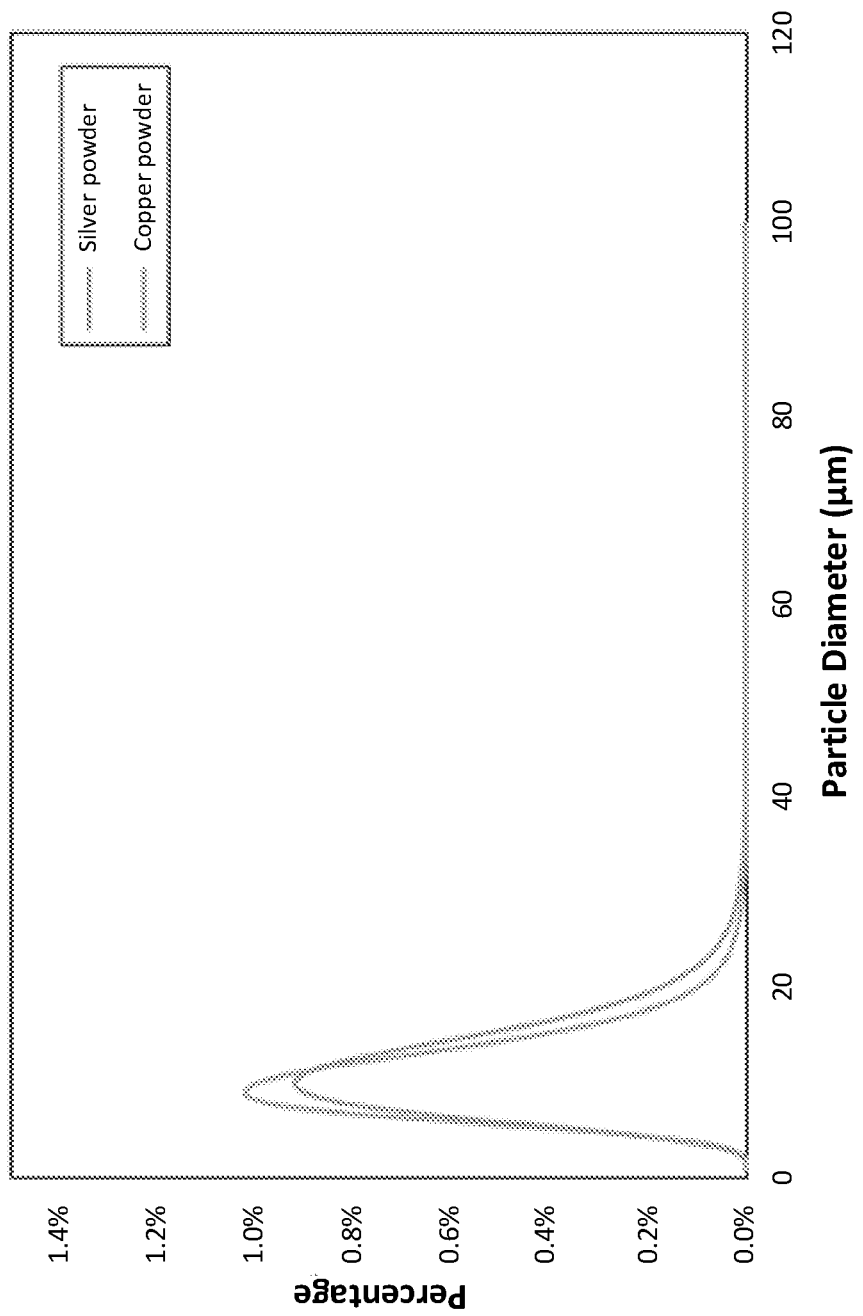
FIG. 5 is a graph showing a particle size distribution of copper powder and silver powder, according to one example.

Referring now to FIGS. 2, 3, and 4, an additive manufacturing plant 300 can include the additive manufacturing system 100, a conveyor 304, and a post-processing station 306. The powder bed 114 containing the three-dimensional object 102 can be moved along the conveyor 304 and into the post-processing station 306. The conveyor 304 can be, for example, a belt conveyor movable in a direction from the additive manufacturing system 100 toward the post-processing station. Additionally, or alternatively, the conveyor 304 can include a cart on which the powder bed 114 is mounted and, in certain instances, the powder bed 114 can be moved from the additive manufacturing system 100 to the post-processing station 306 through movement of the cart (e.g., through the use of actuators to move the cart along rails or by an operator pushing the cart).

In the post-processing station 306, the three-dimensional object 102 can be heated in the powder bed 114 to remove at least some of the liquid of the binder formulation in the three-dimensional object and to form a self-supporting composite within the powder bed. The self-supporting composite can be removed from the powder bed 114. According to some aspects, the binder formulations described herein may aid in attaining a desired mechanical strength characteristic of the self-supporting composite, thereby allowing for improved ability to handle the self-supporting composite and improved consistency in manufactured parts. The powder 104 remaining in the powder bed 114 upon removal of the self-supporting composite can be, for example, recycled for use in subsequent fabrication of additional parts. Additionally, or alternatively, in the post-processing station 306, the self-supporting composite can be cleaned (e.g., through the use of pressurized air) of excess amounts of the powder 104.

In systems employing a binder jetting process, the self-supporting composite can undergo one or more de-binding processes in the post-processing station 306 to remove all or a portion of the polymer of the binder formulation from the three-dimensional object 102. In general, it shall be understood that the nature of the one or more de-binding processes can include any one or more de-binding processes known in the art and is a function of the constituent components of the binder formulation. Thus, as appropriate for a given binder formulation, the one or more de-binding processes can include a thermal de-binding process, a supercritical fluid de-binding process, a catalytic de-binding process, a liquid de-binding process, and combinations thereof. For example, a plurality of de-binding processes can be staged to remove components of the binder formulation in corresponding stages as the three-dimensional object 102 is formed into a finished part.

The post-processing station 306 can include a furnace 308. The three-dimensional object 102 can undergo sintering in the furnace 308 such that the particles of the powder 106 melt and combine with one another to form a finished part. Additionally, or alternatively, one or more de-binding processes can be performed in the furnace 308 as the three-dimensional object 102 undergoes sintering, and/or the one or more de-binding processes can be performed outside of the furnace 308.

The following examples are intended to illustrate certain embodiments of the present invention, but do not exemplify the full scope of the invention.

Example 1

Novel Binders for 3D Printing of Metal Powders and Process of Using these Binders for 3D Printing of Metal Powders.

The following example describes illustrative binder formulations that had favorable fluid properties for jetting and formed high-quality green parts with metal powders.

Formulations described in Table 1 and Table 2 were prepared by charging components into a flask and stirring at room temperature using magnetic stirring until all components dissolved. Solutions were filtered through a 5 micron glass filter. Polyvinylpyrrolidone (PVP) was purchased from Sigma-Aldrich Co; water soluble gelatin, sold as collagen hydrolysate, weight-average molecular weight ($M_n$) approx. 5,000, was purchased from Great Lakes Gelatin Co, Grayslake, Illinois. Chitosan oligosaccharide, CAS #9012-76-4 agricultural grade, was purchased on Ebay. Polyvinyl alcohol (PVA), Poval 3-85, was purchased from Kuraray. Inc. Karo Corn Syrup (76% solids) was purchased from Wegmans supermarket. Viscosity measurements were performed on a Brookfield DV3T rheometer and surface tension was measured using a SITA Dynotester tensiometer.

TABLE 1

Binder Formulations

| Formulation # | Polymer | Polymer amount, (%) | Solvent(s) | Solvent(s), amount, (%) | Additive | Additive amount, (%) |
|---|---|---|---|---|---|---|
| 1 | PVP | 18 | water | 82 | none | 0 |
| 2 | PVP | 17.44 | water | 81.8 | Surfynol 440 | 0.1 |
| 3 | PVP | 18 | water<br>IPA | 72<br>10 | none | 0 |
| 4 | PVP | 19.7 | water | 79.3 | none | 0 |
| 5 | PVP | 21 | water<br>IPA | 74<br>5 | none | 0 |
| 6 | PVP | 19.7 | water | 79.3 | Surfynol 440 | 0.1 |
| 7 | PVP | 23 | water | 77 | Surfynol 440 | 0.1 |
| 8 | PVP | 23 | water | 76.9 | Surfynol 440 | 0.2 |
| 9 | chitosan | 30 | water | 70 | none | 0 |
| 10 | chitosan | 30 | water | 69.9 | Surfynol 440 | 0.1 |
| 11 | Gelatine | 24.9% | water | 74.85 | Surfynol 440<br>ProxeGXL | 0.05<br>0.2 |
| 12 | PVA | 6 | water | 94 | None | 0 |
| 13 | Corn starch | 33 | water | 67 | None | 0 |

TABLE 2

Properties of binder formulation

| Formulation# | Viscosity (cP) | Surface tension (dynes/cm) |
|---|---|---|
| 1 | 4.7 | 66 |
| 2 | 4.1 | 35.4 |
| 3 | 7.9 | 35.3 |
| 4 | 5.4 | 68.0 |
| 5 | 7.6 | 44.5 |
| 6 | 6.0 | 35 |
| 7 | 7.9 | 32 |
| 8 | 7.3 | 36 |
| 9 | 4.66 | 72 |
| 10 | 4.95 | 30 |
| 11 | 5.6 | 45 |
| 12 | 5.3 | 65 |
| 13 | 4.44 | 70 |

Table 2 demonstrates that the binder formulations described in Table 1 had favorable viscosity and surface tension values for jetting performance.

Droplet Formation Using Ink-Jet Print Head.

Droplets were produced using a Samba G3L ink-jet print head equipped with Megnajet CIMS-2HFR (available from Megnajet, Northamptonshire, England) recirculation system. Droplet volume and velocity were determined using a stroboscope, a camera, and imaging software, all available from JetXpert, Nashua, NH, USA. For each binder formulation, the droplet formation was optimized by changing ink-jet pulse voltage, pulse time, and pulse sequence to achieve the volume of an individual droplet in the range of from 9 pL to 12 pL and velocity in range of from 8 m/sec to 12 m/sec measured at 0.5 mm from the print head nozzle at 24 kHz pulse frequency. If more than 1 droplet was produced per each pulse sequence, the pulse sequence was optimized in such a way that all the droplets coalesce in a single droplet not farther than 0.5 mm from the print head nozzle. After droplet formation was optimized, each binder formulation was tested for droplet production latency as follows: a print head was turned on and stable droplet formation was established, then the print head was turned off for 5 sec and turned back on again. The number of droplets it took for stable droplet formation to re-establish was recorded. Results are shown in Table 3.

TABLE 3

Droplet formation and latency properties of binder formulation

| Formulation # | Droplet volume (pL) | Droplet velocity (m/sec) | Latency (# drop producing pulses prior to droplet formation) |
|---|---|---|---|
| 1 | 12 | 9 | 30 |
| 2 | 9.7 | 10 | 40 |
| 5 | 10 | 9 | 50 |
| 6 | 12 | 9 | 10 |
| 7 | 11 | 8 | >290 |
| 9 | 12 | 11 | 40 |
| 10 | 10 | 8.5 | >290 |
| 11 | 12 | 10 | 30 |
| 12 | 12 | 8 | >500 |

Table 3 demonstrates that binder formulations of the current disclosure can be printed using conventional on-demand ink-jet technology and that such binder formulations have advantageously low latencies.

Mechanical Strength Measurements—Transverse Rupture Strength (TRS) of Binder Formulations.

A typical specimen set for TRS testing was prepared by charging about 250 g of Cu (copper) or sterling silver powder supplied by Carpenter Powder Products of Woonsocket, RI (D50 approx. 15 microns) and about 40 g of binder formulation into a mixing cup of Flack Tech Speed Mixer. The cup was spun at about 700 rpm under 20 mmHg vacuum for 4 min to produce an even, bubble-free suspension. The suspension was poured into four molds with dimensions 5.08 cm×1.91 cm×1.59 cm. After the metal (e.g., copper or sterling silver) powder settled for 2 hrs., supernatant liquid was removed by pipette and mold was left to dry in air for 14 hrs. Then, the mold was placed in an oven under nitrogen flow and subjected to the following cure procedure: heat to 60° C., 45 min hold, heat to 75° C., 45 min hold, heat to 90° C., 1 hr hold, heat to desired temperature, and then 2 hrs hold. After the final 2 hrs hold, heat was turned off and oven was allowed to cool down to at least 80° C. under nitrogen flow. The resulting metal-binder composite bars (e.g., copper-binder composite bars or sterling silver-binder composite bars) were de-molded and sanded with 220 grit sandpaper to produce smooth, even surfaces and corner without sharp edges. The TRS of the metal-binder composite bars (e.g., copper-binder composite bars or sterling silver-binder composite bars) were tested according to ASTM B528-16. The results for the copper-binder composite bars are in Table 4 and the results for the sterling silver-binder composite bars are in Table 5.

TABLE 4

Mechanical properties of composite bars formed from binder formulations

| Formulation | Cure Temperature (° C.) | TRS (MPa) |
|---|---|---|
| 2 | 140 | 10 |
| 6 | 120 | 11 |
|   | 140 | 13 |
|   | 160 | 19 |
|   | 180 | 20 |
| 7 | 140 | 23 |
| 9 | 140 | 14 |
|   | 160 | 15 |
|   | 180 | 25 |
| 11 | 140 | 13 |
|   | 160 | 20 |
|   | 180 | 9 |
| 12 | 180 | 4 (many cracks were observed) |
| 13 | 160 | Cracked |

TABLE 5

Mechanical properties of composite bars formed from binder formulations

| Formulation | Cure Temperature (° C.) | TRS (MPa) |
|---|---|---|
| 9 | 160 | 15 |
| 12 | 160 | 3 |

Tables 4 and 5 show that binder formulations of the current disclosure are capable of forming a metal-binder composite strong enough to produce a self-supporting "brown" part. Some such binder formulations are capable of forming self-supporting "brown" parts having advantageous values of transverse rupture strength.

A typical particle size distribution of copper powder and of silver powder suitable for an additive manufacturing or other powder metallurgical process of the current disclosure is shown in FIG. 1.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of fabricating a metal part through additive manufacturing, the method comprising:
   depositing a binder formulation onto a powder layer comprising a plurality of metal particles to form a composite layer, wherein the plurality of metal particles comprise particles of a noble metal and/or copper;
   curing the composite layer; and
   heating the cured composite layer such that at least a portion of the binder formulation is removed from the cured composite layer,
   wherein the binder formulation comprises a solution comprising a liquid and a polymer comprising repeat units, wherein the polymer is dissolved in the liquid, and wherein at least 40% of the repeat units of the polymer are nitrogen-containing repeat units.

2. A method as in claim 1, wherein the depositing step comprises producing a droplet of the binder formulation having a droplet size of between or equal to 0.5 pL and 20 pL, or between or equal to 2 pL and 20 pL, or between or equal to 0.5 pL and 2 pL.

3. A method as in claim 1, wherein the depositing step comprises producing a droplet of the binder formulation using a piezoelectric print head or thermal print head component.

4. A method as in claim 1, wherein the curing step comprises heating an environment in which the composite layer is positioned to a temperature of between or equal to 120° C. and 220° C.

5. A method as in claim 1, wherein the step of heating the cured composite layer comprises heating an environment in which the cured composite layer is positioned to a temperature of between or equal to 220° C. and 1200° C.

6. A method as in claim 4, wherein the step of heating an environment in which the composite layer is positioned is performed in air or in inert gas.

7. A method as in claim 1, further comprising sintering the cured composite layer to form the metal part.

8. A method as in claim 7, wherein the heating step and the sintering step are performed in an environment comprising at least 2 wt % hydrogen.

9. A method as in claim 7, wherein sintering is performed at a temperature of greater than or equal to 750° C. and less than or equal to 1700° C.

10. A method as in claim 7, wherein the metal part has a relative density of at least 94%.

11. A method as in claim 1, further comprising depositing a second powder layer on the deposited binder formulation to form the composite layer.

12. A method as in claim 1, wherein the step of heating the cured composite layer comprises heating an environment in which the cured composite layer is positioned to a temperature of greater than or equal to 220° C. and less than or equal to 300° C. in an oxidative environment.

13. A method as in claim 5, wherein the step of heating an environment in which the cured composite layer is positioned is performed in a gaseous environment having an oxygen content of at most 10 ppm.

14. A method as in claim 7, wherein sintering is performed at a temperature of at most 850° C.

15. A method as in claim 1, wherein the nitrogen-containing repeat units comprise a repeat unit of a polypeptide, a protein, a polyacrylamide, or a glycosaminoglycan.

16. A method as in claim 1, wherein the polymer comprises polyvinylpyrrolidone, poly(2-(diethylamino)ethyl methacrylate), polyacrylamide, poly(N-isopropylacrylamide), and/or N-(2-hydroxypropyl) methacrylamide (HPMA).

17. A method as in claim 1, wherein the plurality of metal particles comprise particles of ruthenium, rhodium, palladium, silver, osmium, iridium, platinum, and/or gold.

18. A method as in claim 17, wherein the noble metal comprises gold, silver, and/or platinum.

19. A method as in claim 17, wherein the noble metal comprises silver.

20. A method as in claim 1, wherein the plurality of metal particles comprise copper particles.

21. A method as in claim 1, wherein the liquid comprises water.

* * * * *